(12) United States Patent
Ogawa

(10) Patent No.: US 11,869,384 B2
(45) Date of Patent: *Jan. 9, 2024

(54) INFORMATION PROCESSING APPARATUS, INFORMATION PROCESSING SYSTEM, AND NON-TRANSITORY COMPUTER READABLE MEDIUM

(71) Applicant: FUJIFILM BUSINESS INNOVATION CORP., Tokyo (JP)

(72) Inventor: Masakazu Ogawa, Kanagawa (JP)

(73) Assignee: FUJIFILM BUSINESS INNOVATION CORP., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/238,696

(22) Filed: Apr. 23, 2021

(65) Prior Publication Data

US 2021/0241643 A1    Aug. 5, 2021

Related U.S. Application Data

(63) Continuation of application No. 16/800,309, filed on Feb. 25, 2020, now Pat. No. 11,017,684, which is a
(Continued)

(30) Foreign Application Priority Data

Aug. 22, 2016  (JP) ................. 2016-162233

(51) Int. Cl.
*H04N 21/475* (2011.01)
*G09B 5/10* (2006.01)
(Continued)

(52) U.S. Cl.
CPC ............. *G09B 5/10* (2013.01); *G06F 40/166* (2020.01); *G06F 40/279* (2020.01); *G09B 5/06* (2013.01); *H04N 21/4758* (2013.01)

(58) Field of Classification Search
CPC ................................................. H04N 21/4758
See application file for complete search history.

(56) References Cited

U.S. PATENT DOCUMENTS

2011/0145848 A1* 6/2011 Moskowitz ............ H04H 60/33
725/62
2012/0072261 A1* 3/2012 Oberoi ............... G06Q 30/0203
705/7.32
(Continued)

FOREIGN PATENT DOCUMENTS

JP    2002-169830 A    6/2002
JP    2003-162491 A    6/2003
(Continued)

OTHER PUBLICATIONS

Feb. 12, 2018 Office Action issued in U.S. Appl. No. 15/441,753.
(Continued)

*Primary Examiner* — Michael H Hong
(74) *Attorney, Agent, or Firm* — Oliff PLC

(57) ABSTRACT

An information processing apparatus includes an acquisition unit and a changing unit. The acquisition unit acquires character information input by a viewer to content. The changing unit changes a representation form of a frequent word which is character information with a high appearance frequency among character information input by multiple viewers to the content.

1 Claim, 20 Drawing Sheets

Related U.S. Application Data continuation of application No. 15/441,753, filed on Feb. 24, 2017, now Pat. No. 10,629,087.

(51) Int. Cl.
*G09B 5/06* (2006.01)
*G06F 40/166* (2020.01)
*G06F 40/279* (2020.01)

(56) References Cited

U.S. PATENT DOCUMENTS

| | | | |
|---|---|---|---|
| 2013/0097476 A1 | 4/2013 | Kuroda | |
| 2016/0070762 A1* | 3/2016 | Nicholls | G06F 16/3329 707/722 |
| 2016/0203147 A1* | 7/2016 | Ikeda | H04L 51/216 715/234 |

FOREIGN PATENT DOCUMENTS

| | | |
|---|---|---|
| JP | 2011-118292 A | 6/2011 |
| JP | 2013-089052 A | 5/2013 |
| JP | 2013-131221 A | 7/2013 |
| JP | 2015-064623 A | 4/2015 |
| JP | 2016-091487 A | 5/2016 |

OTHER PUBLICATIONS

Sep. 14, 2018 Office Action issued in U.S. Appl. No. 15/441,753.
Jul. 30, 2019 Office Action issued in U.S. Appl. No. 15/441,753.
Feb. 12, 2020 Office Action issued in Japanese Patent Application No. 2016-162233.
Jul. 21, 2020 Office Action issued in U.S. Appl. No. 16/800,309.
Jan. 27, 2021 Notice of Allowance Issued in U.S. Appl. No. 16/800,309.
Jan. 10, 2019 Office Action issued in U.S. Appl. No. 15/441,753.
Sep. 20, 2022 Office Action issued in Chinese Patent Application No. 201710321389.3.
May 15, 2023 Office Action issued in Chinese Patent Application No. 201710321389.3.
Aug. 16, 2023 Office Action issued in Chinese Patent Application No. 20170321389.3.

* cited by examiner

FIG. 4

| LECTURE TITLE | MATERIAL IMAGE INFORMATION | | MATERIAL SOUND INFORMATION | | SYNCHRONIZATION INFORMATION |
| --- | --- | --- | --- | --- | --- |
| | IMAGE FILE PATH | IMAGE TEXT FILE PATH | AUDIO FILE PATH (FILE PATH OF MOVING IMAGE WITH SOUND) | AUDIO TEXT FILE PATH | SYNCHRONIZATION FILE PATH |
| GEOGRAPHY (SHIKOKU) | c:\slide\shikoku.ppt | c:\slidetxt\shikoku.txt | c:\video\shikoku.wmv | c:\audio\shikoku.txt | c:\link\shikoku.dat |
| GEOGRAPHY (KYUSHU) | c:\slide\kyusyu.ppt | c:\slidetxt\kyusyu.txt | c:\video\kyusyu.wmv | c:\audio\kyusyu.txt | c:\link\kyusyu.dat |
| ... | ... | ... | ... | ... | ... |

FIG. 5

| | | FIRST PAGE | SECOND PAGE | THIRD PAGE |
|---|---|---|---|---|
| MATERIAL IMAGE INFORMATION | IMAGE FILE | GEOGRAPHY (SHIKOKU) | SHIKOKU<br>NAME OF PREFECTURE / AREA (km²) / POPULATION (IN THOUSANDS) / POPULATION DENSITY (PERSONS/km²)<br>TOKUSHIMA 4,147 770 185.6<br>KAGAWA 1,877 985 525.2<br>EHIME 5,679 1,405 247.5<br>KOCHI 7,105 745 104.8<br>KAGAWA PREFECTURE IS PREFECTURE WITH THE SMALLEST AREA | ⋮ |
| | IMAGE TEXT FILE | GEOGRAPHY, SHIKOKU | SHIKOKU, NAME OF PREFECTURE, TOKUSHIMA, KAGAWA, EHIME, KOCHI, AREA, POPULATION, POPULATION DENSITY | ⋮ |
| MATERIAL SOUND INFORMATION | AUDIO FILE | NOW WE'LL STUDY GEOGRAPHY OF SHIKOKU. | SHIKOKU INCLUDES 4 PREFECTURES: TOKUSHIMA PREFECTURE, KAGAWA PREFECTURE, EHIME PREFECTURE, AND KOCHI PREFECTURE. TOKUSHIMA PREFECTURE IS FAMOUS FOR AWA ODORI. KAGAWA PREFECTURE IS FAMOUS FOR SANUKI UDON, AND IS ALSO CALLED UDON PREFECTURE. KAGAWA PREFECTURE IS PREFECTURE WITH THE SMALLEST AREA AMONG 47 PREFECTURES IN JAPAN AND HAS THE HIGHEST POPULATION DENSITY AMONG 4 PREFECTURES IN SHIKOKU. EHIME PREFECTURE IS FAMOUS FOR GROWING ORANGES. EHIME PREFECTURE HAS THE LARGEST POPULATION AMONG 4 PREFECTURES IN SHIKOKU. KOCHI PREFECTURE IS FAMOUS AS THE BIRTHPLACE OF RYOMA SAKAMOTO. KOCHI PREFECTURE IS PREFECTURE WITH THE LARGEST AREA AMONG 4 PREFECTURES IN SHIKOKU. | ⋮ |
| | AUDIO TEXT FILE | SHIKOKU, GEOGRAPHY, STUDY | SHIKOKU, TOKUSHIMA PREFECTURE, KAGAWA PREFECTURE, EHIME PREFECTURE, KOCHI PREFECTURE, AWA ODORI, SANUKI UDON, UDON PREFECTURE, PREFECTURES, AREA, POPULATION DENSITY, ORANGES, GROWING, POPULATION, RYOMA SAKAMOTO, BIRTHPLACE | ⋮ |

FIG. 6

| PARTICIPANT | LECTURE TITLE | | |
| --- | --- | --- | --- |
| | GEOGRAPHY (SHIKOKU) | | |
| | FIRST PAGE | SECOND PAGE | THIRD PAGE |
| A | (BLANK) | KAGAWA PREFECTURE IS UDON PREFECTURE. | ⋮ |
| B | (BLANK) | EHIME PREFECTURE IS FAMOUS FOR ORANGES. KAGAWA UDON PREFECTURE | ⋮ |
| C | (BLANK) | EHIME PREFECTURE HAS THE LARGEST POPULATION. | ⋮ |
| D | (BLANK) | KOCHI PREFECTURE HAS A LARGE AREA. | ⋮ |
| E | (BLANK) | (BLANK) | ⋮ |

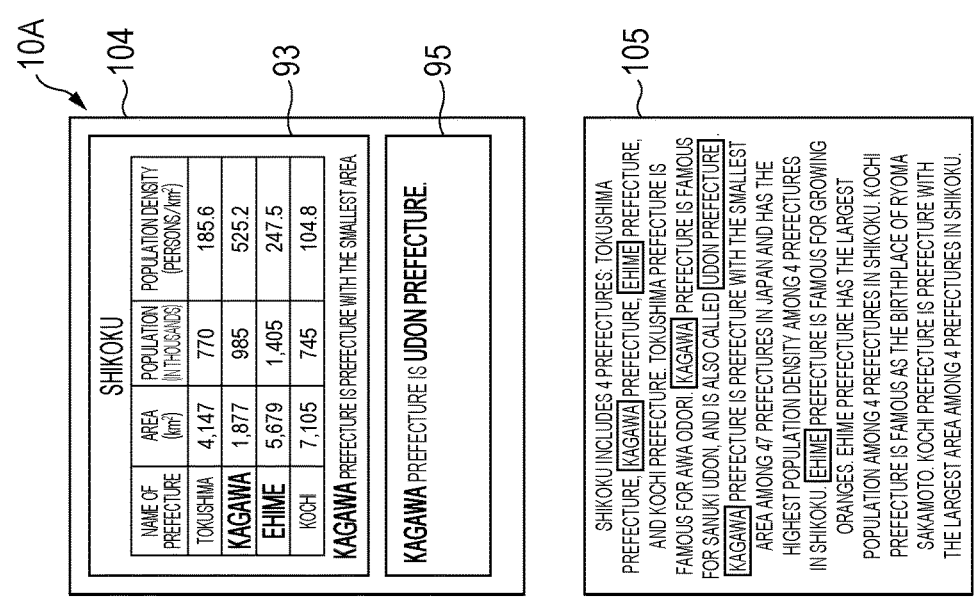
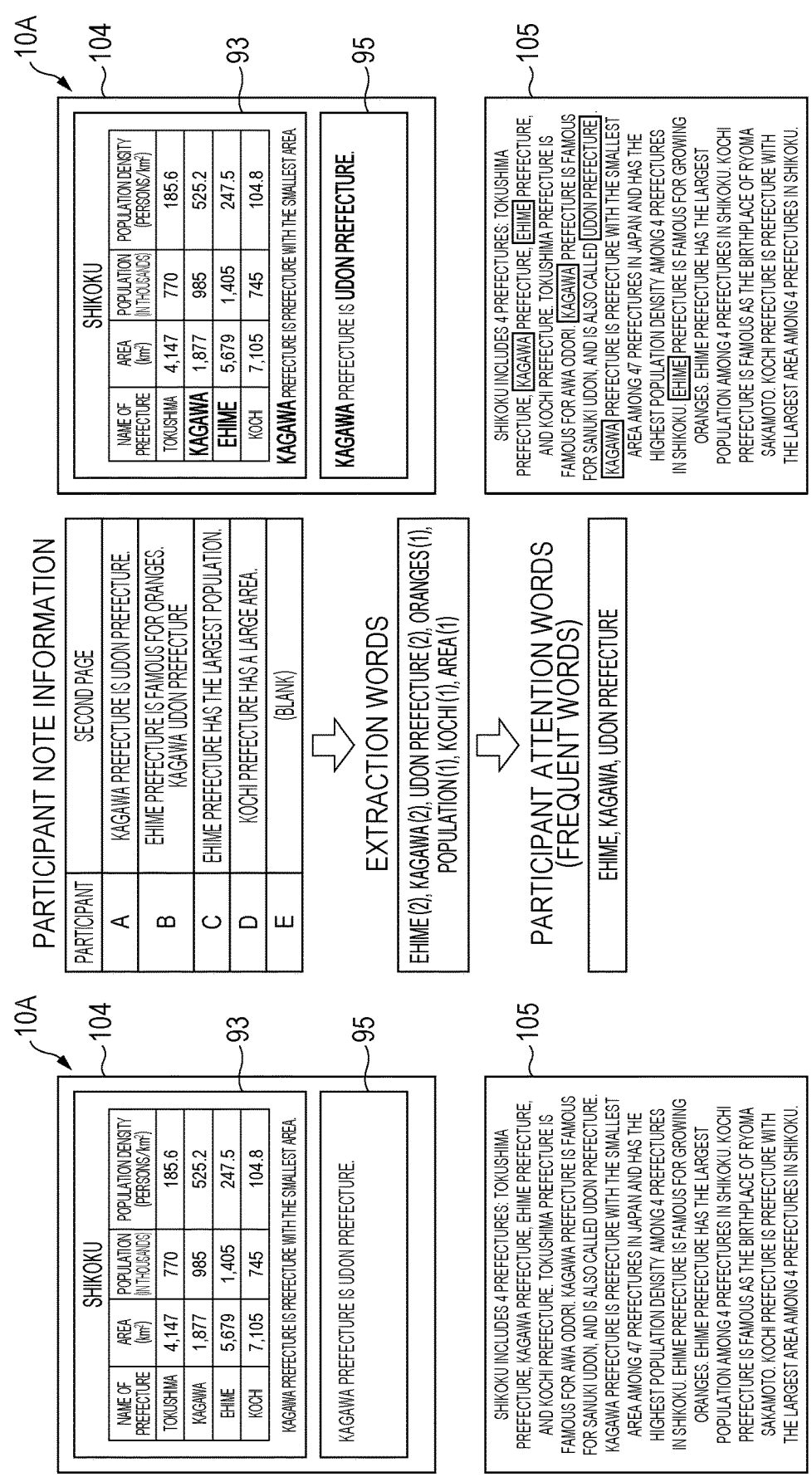

FIG. 14A

SHIKOKU

| NAME OF PREFECTURE | AREA (km²) | POPULATION (IN THOUSANDS) | POPULATION DENSITY (PERSONS/km²) |
|---|---|---|---|
| TOKUSHIMA | 4,147 | 770 | 185.6 |
| KAGAWA | 1,877 | 985 | 525.2 |
| EHIME | 5,679 | 1,405 | 247.5 |
| KOCHI | 7,105 | 745 | 104.8 |

KAGAWA PREFECTURE IS PREFECTURE WITH THE SMALLEST AREA.

KAGAWA PREFECTURE IS UDON PREFECTURE.

FIG. 14B

SHIKOKU

| NAME OF PREFECTURE | AREA (km²) | POPULATION (IN THOUSANDS) | POPULATION DENSITY (PERSONS/km²) |
|---|---|---|---|
| TOKUSHIMA | 4,147 | 770 | 185.6 |
| KAGAWA | 1,877 | 985 | 525.2 |
| EHIME | 5,679 | 1,405 | 247.5 |
| KOCHI | 7,105 | 745 | 104.8 |

KAGAWA PREFECTURE IS PREFECTURE WITH THE SMALLEST AREA.

EHIME PREFECTURE IS FAMOUS FOR ORANGES.
KAGAWA UDON PREFECTURE

FIG. 14C

SHIKOKU

| NAME OF PREFECTURE | AREA (km²) | POPULATION (IN THOUSANDS) | POPULATION DENSITY (PERSONS/km²) |
|---|---|---|---|
| TOKUSHIMA | 4,147 | 770 | 185.6 |
| KAGAWA | 1,877 | 985 | 525.2 |
| EHIME | 5,679 | 1,405 | 247.5 |
| KOCHI | 7,105 | 745 | 104.8 |

KAGAWA PREFECTURE IS PREFECTURE WITH THE SMALLEST AREA.

EHIME PREFECTURE HAS THE LARGEST POPULATION.

FIG. 14D

SHIKOKU

| NAME OF PREFECTURE | AREA (km²) | POPULATION (IN THOUSANDS) | POPULATION DENSITY (PERSONS/km²) |
|---|---|---|---|
| TOKUSHIMA | 4,147 | 770 | 185.6 |
| KAGAWA | 1,877 | 985 | 525.2 |
| EHIME | 5,679 | 1,405 | 247.5 |
| KOCHI | 7,105 | 745 | 104.8 |

KAGAWA PREFECTURE IS PREFECTURE WITH THE SMALLEST AREA.

KOCHI PREFECTURE HAS A LARGE AREA.

FIG. 14E

SHIKOKU

| NAME OF PREFECTURE | AREA (km²) | POPULATION (IN THOUSANDS) | POPULATION DENSITY (PERSONS/km²) |
|---|---|---|---|
| TOKUSHIMA | 4,147 | 770 | 185.6 |
| KAGAWA | 1,877 | 985 | 525.2 |
| EHIME | 5,679 | 1,405 | 247.5 |
| KOCHI | 7,105 | 745 | 104.8 |

KAGAWA PREFECTURE IS PREFECTURE WITH THE SMALLEST AREA.

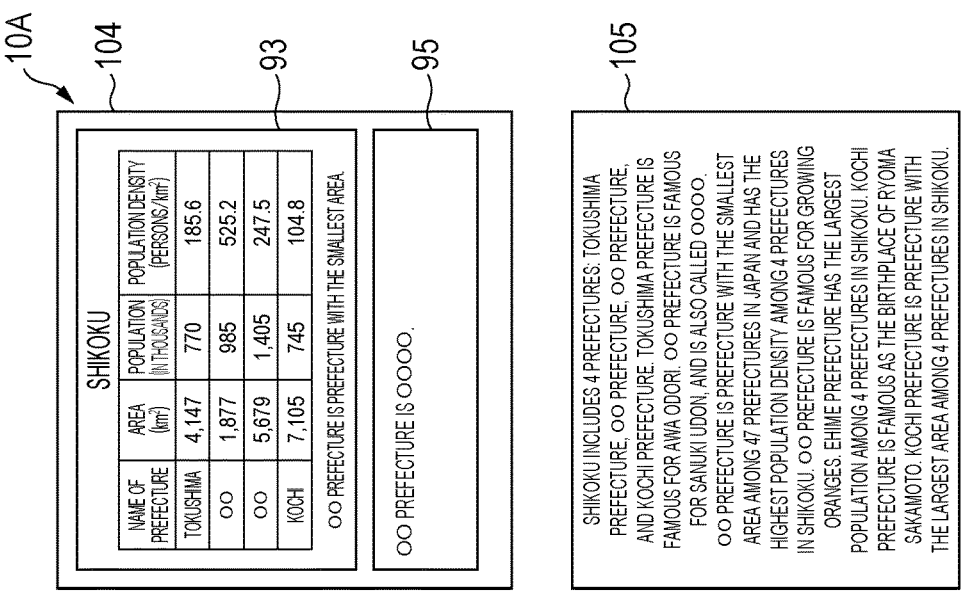
FIG. 15C
FIG. 15B
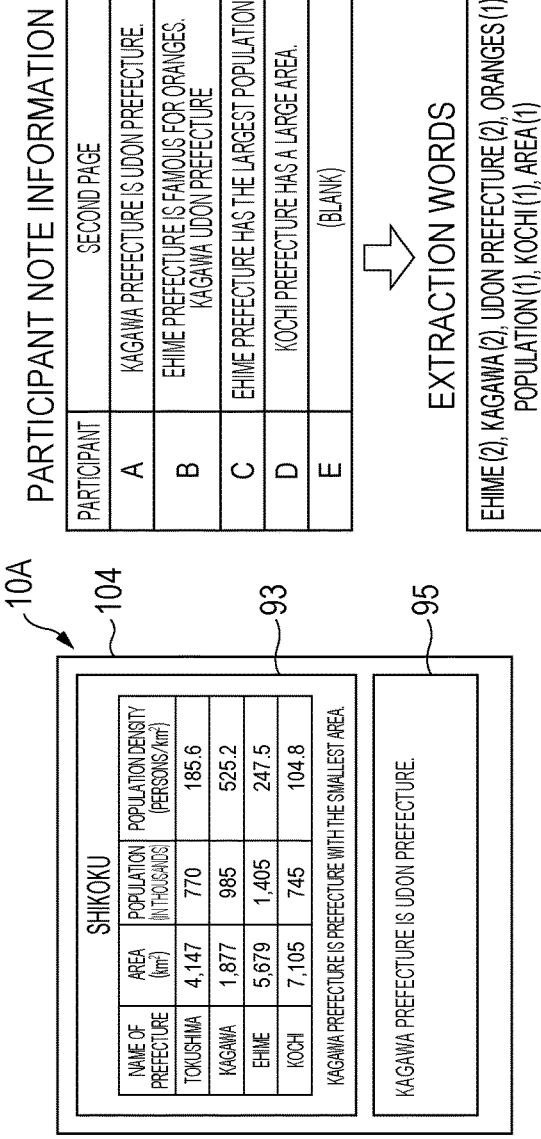
FIG. 15A

FIG. 16A

SHIKOKU

| NAME OF PREFECTURE | AREA (km²) | POPULATION (IN THOUSANDS) | POPULATION DENSITY (PERSONS/km²) |
|---|---|---|---|
| TOKUSHIMA | 4,147 | 770 | 185.6 |
| ○○ | 1,877 | 985 | 525.2 |
| ○○ | 5,679 | 1,405 | 247.5 |
| KOCHI | 7,105 | 745 | 104.8 |

○○ PREFECTURE IS PREFECTURE WITH THE SMALLEST AREA

○○ PREFECTURE IS ○○○○.

FIG. 16B

SHIKOKU

| NAME OF PREFECTURE | AREA (km²) | POPULATION (IN THOUSANDS) | POPULATION DENSITY (PERSONS/km²) |
|---|---|---|---|
| TOKUSHIMA | 4,147 | 770 | 185.6 |
| ○○ | 1,877 | 985 | 525.2 |
| ○○ | 5,679 | 1,405 | 247.5 |
| KOCHI | 7,105 | 745 | 104.8 |

○○ PREFECTURE IS PREFECTURE WITH THE SMALLEST AREA

○○ PREFECTURE IS FAMOUS FOR ORANGES.
○○○○○○

FIG. 16C

SHIKOKU

| NAME OF PREFECTURE | AREA (km²) | POPULATION (IN THOUSANDS) | POPULATION DENSITY (PERSONS/km²) |
|---|---|---|---|
| TOKUSHIMA | 4,147 | 770 | 185.6 |
| ○○ | 1,877 | 985 | 525.2 |
| ○○ | 5,679 | 1,405 | 247.5 |
| KOCHI | 7,105 | 745 | 104.8 |

○○ PREFECTURE IS PREFECTURE WITH THE SMALLEST AREA.

○○ PREFECTURE HAS THE LARGEST POPULATION.

FIG. 16D

SHIKOKU

| NAME OF PREFECTURE | AREA (km²) | POPULATION (IN THOUSANDS) | POPULATION DENSITY (PERSONS/km²) |
|---|---|---|---|
| TOKUSHIMA | 4,147 | 770 | 185.6 |
| ○○ | 1,877 | 985 | 525.2 |
| ○○ | 5,679 | 1,405 | 247.5 |
| KOCHI | 7,105 | 745 | 104.8 |

○○ PREFECTURE IS PREFECTURE WITH THE SMALLEST AREA

KOCHI PREFECTURE HAS A LARGE AREA.

FIG. 16E

SHIKOKU

| NAME OF PREFECTURE | AREA (km²) | POPULATION (IN THOUSANDS) | POPULATION DENSITY (PERSONS/km²) |
|---|---|---|---|
| TOKUSHIMA | 4,147 | 770 | 185.6 |
| ○○ | 1,877 | 985 | 525.2 |
| ○○ | 5,679 | 1,405 | 247.5 |
| KOCHI | 7,105 | 745 | 104.8 |

○○ PREFECTURE IS PREFECTURE WITH THE SMALLEST AREA.

FIG. 18

| | FIRST PAGE | SECOND PAGE | THIRD PAGE |
|---|---|---|---|
| LECTURE TITLE | | | |
| GEOGRAPHY (SHIKOKU) | (BLANK) | KAGAWA, POPULATION DENSITY, AREA | ... |

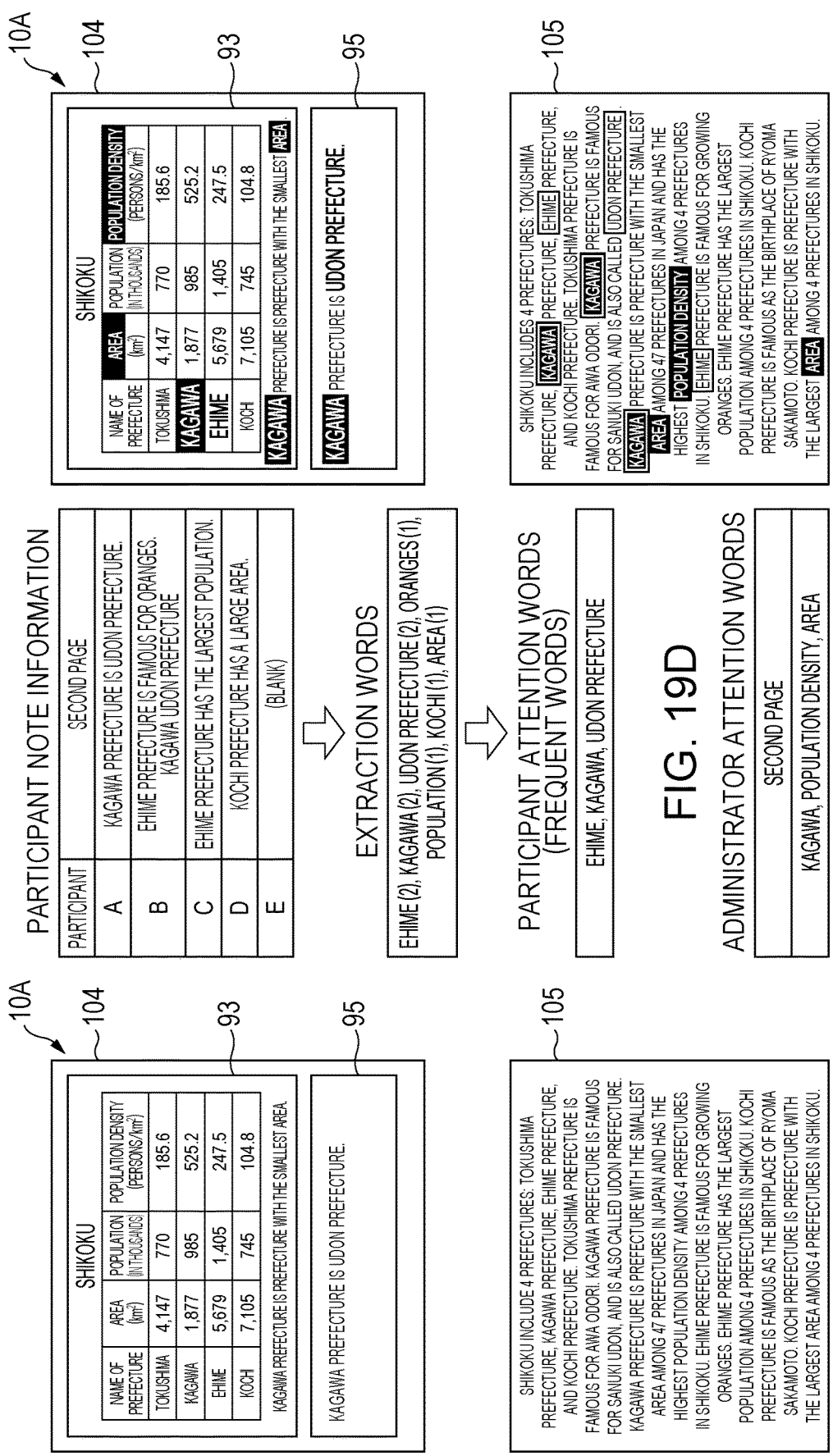

FIG. 20A

SHIKOKU

| NAME OF PREFECTURE | AREA (km²) | POPULATION (IN THOUSANDS) | POPULATION DENSITY (PERSONS/km²) |
|---|---|---|---|
| TOKUSHIMA | 4,147 | 770 | 185.6 |
| KAGAWA | 1,877 | 985 | 525.2 |
| EHIME | 5,679 | 1,405 | 247.5 |
| KOCHI | 7,105 | 745 | 104.8 |

KAGAWA PREFECTURE IS PREFECTURE WITH THE SMALLEST AREA.

KAGAWA PREFECTURE IS UDON PREFECTURE.

FIG. 20B

SHIKOKU

| NAME OF PREFECTURE | AREA (km²) | POPULATION (IN THOUSANDS) | POPULATION DENSITY (PERSONS/km²) |
|---|---|---|---|
| TOKUSHIMA | 4,147 | 770 | 185.6 |
| KAGAWA | 1,877 | 985 | 525.2 |
| EHIME | 5,679 | 1,405 | 247.5 |
| KOCHI | 7,105 | 745 | 104.8 |

KAGAWA PREFECTURE IS PREFECTURE WITH THE SMALLEST AREA.

EHIME PREFECTURE IS FAMOUS FOR ORANGES.
KAGAWA UDON PREFECTURE

FIG. 20C

SHIKOKU

| NAME OF PREFECTURE | AREA (km²) | POPULATION (IN THOUSANDS) | POPULATION DENSITY (PERSONS/km²) |
|---|---|---|---|
| TOKUSHIMA | 4,147 | 770 | 185.6 |
| KAGAWA | 1,877 | 985 | 525.2 |
| EHIME | 5,679 | 1,405 | 247.5 |
| KOCHI | 7,105 | 745 | 104.8 |

KAGAWA PREFECTURE IS PREFECTURE WITH THE SMALLEST AREA.

EHIME PREFECTURE HAS THE LARGEST POPULATION.

FIG. 20D

SHIKOKU

| NAME OF PREFECTURE | AREA (km²) | POPULATION (IN THOUSANDS) | POPULATION DENSITY (PERSONS/km²) |
|---|---|---|---|
| TOKUSHIMA | 4,147 | 770 | 185.6 |
| KAGAWA | 1,877 | 985 | 525.2 |
| EHIME | 5,679 | 1,405 | 247.5 |
| KOCHI | 7,105 | 745 | 104.8 |

KAGAWA PREFECTURE IS PREFECTURE WITH THE SMALLEST AREA.

KOCHI PREFECTURE HAS A LARGE AREA.

FIG. 20E

SHIKOKU

| NAME OF PREFECTURE | AREA (km²) | POPULATION (IN THOUSANDS) | POPULATION DENSITY (PERSONS/km²) |
|---|---|---|---|
| TOKUSHIMA | 4,147 | 770 | 185.6 |
| KAGAWA | 1,877 | 985 | 525.2 |
| EHIME | 5,679 | 1,405 | 247.5 |
| KOCHI | 7,105 | 745 | 104.8 |

KAGAWA PREFECTURE IS PREFECTURE WITH THE SMALLEST AREA.

INFORMATION PROCESSING APPARATUS, INFORMATION PROCESSING SYSTEM, AND NON-TRANSITORY COMPUTER READABLE MEDIUM

CROSS-REFERENCE TO RELATED APPLICATIONS

This application is a continuation of U.S. application Ser. No. 16/800,309 filed on Feb. 25, 2020, which is a continuation of U.S. application Ser. No. 15/441,753 filed on Feb. 24, 2017, which is based on and claims priority under 35 USC 119 from Japanese Patent Application No. 2016-162233 filed Aug. 22, 2016.

BACKGROUND

The present invention relates to an information processing apparatus, an information processing system, and a non-transitory computer readable medium.

SUMMARY

According to an aspect of the invention, there is provided an information processing apparatus includes an acquisition unit and a changing unit. The acquisition unit acquires character information input by a viewer to content including an image or sound. The changing unit changes a representation form of a frequent word which is character information with a high appearance frequency among character information input by multiple viewers to the content.

BRIEF DESCRIPTION OF THE DRAWINGS

Exemplary embodiments of the present invention will be described in detail based on the following figures, wherein:

FIG. 4 is a diagram illustrating an example of a configuration of a lecture material management table;

FIG. 5 is a diagram illustrating an example of a lecture material;

FIG. 6 is a diagram illustrating an example of a configuration of a participant note management table;

FIGS. 13A to 13C are diagrams for explaining a first specific example of the first exemplary embodiment;

FIGS. 14A to 14E are diagrams for explaining a second specific examples of the first exemplary embodiment;

FIGS. 15A to 15C are diagrams for explaining a first specific example of a second exemplary embodiment;

FIGS. 16A to 16E are diagrams for explaining a second specific example of the second exemplary embodiment;

FIG. 18 is a diagram illustrating an example of a configuration of an administrator attention word management table;

FIGS. 19A to 19D are diagrams for explaining a first specific example of the third exemplary embodiment; and FIGS. 20A to 20E are diagrams for explaining a second specific example of the third exemplary embodiment.

DETAILED DESCRIPTION

Hereinafter, exemplary embodiments of the present invention will be described in detail with reference to attached drawings.

First Exemplary Embodiment

[Entire Configuration of Video Distribution System]

Figure 1:
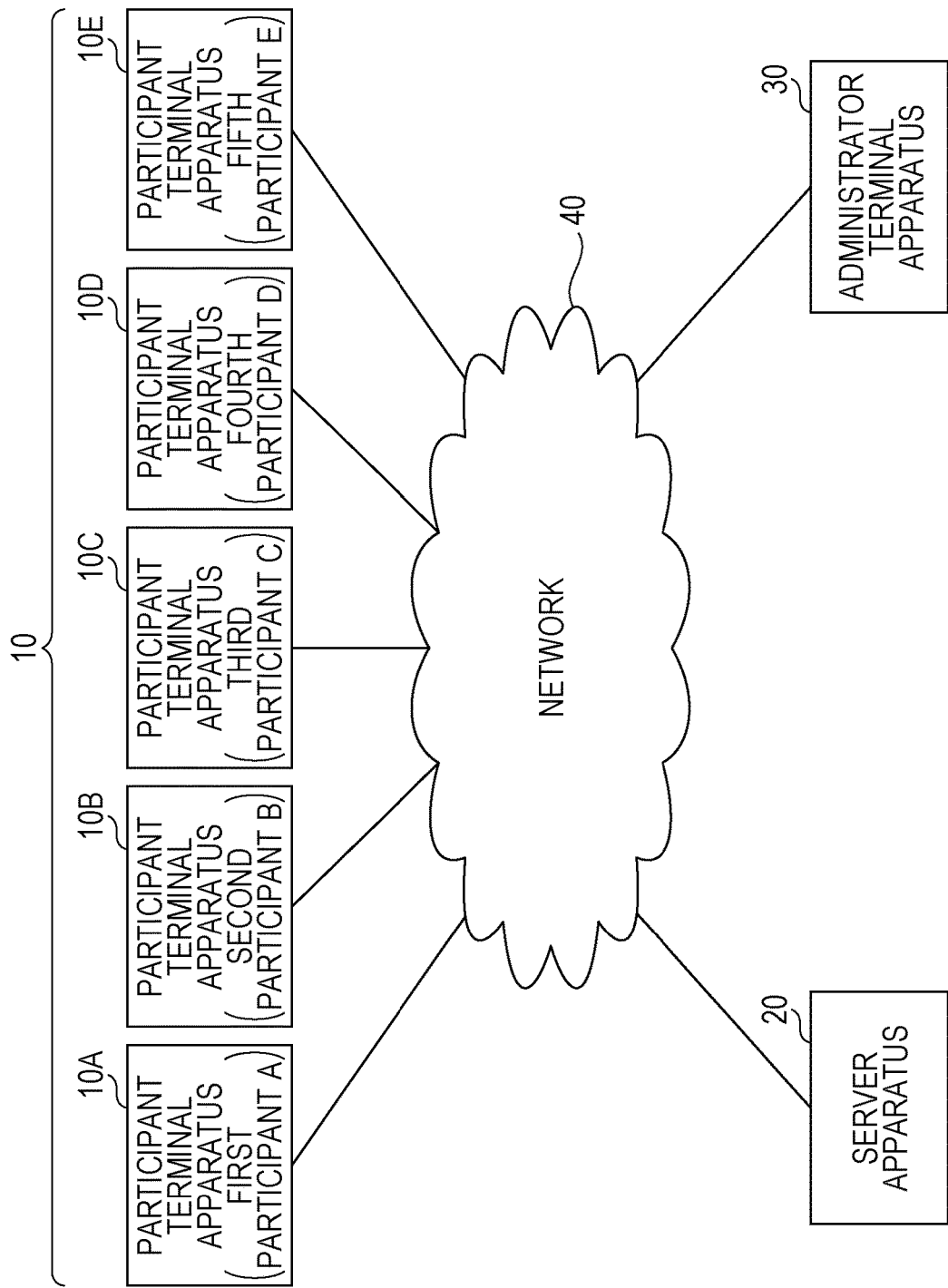
FIG. 1 is a diagram illustrating the entire configuration of a video distribution system to which an exemplary embodiment is applied.

FIG. 1 is a diagram illustrating the entire configuration of a video distribution system 1 to which an exemplary embodiment is applied.

The video distribution system 1 includes a participant terminal apparatus group 10 including multiple (in this example, five) participant terminal apparatuses 10A to 10E, a server apparatus 20, an administrator terminal apparatus 30, and a network 40 which allows connection among the above apparatuses.

Each of the participant terminal apparatuses 10A to 10E forming the participant terminal apparatus group 10 is a computer apparatus which is assumed to be used by a participant (for example, a student) who receives a lecture by video distribution, the lecture including content (referred to as a lecture material) including image information and audio information. Furthermore, in this example, it is assumed that a first participant A uses the participant terminal apparatus 10A, a second participant B uses the participant terminal apparatus 10B, a third participant C uses the participant terminal apparatus 10C, a fourth participant D uses the participant terminal apparatus 10D, and a fifth participant E uses the participant terminal apparatus 10E. In this example, the participant terminal apparatus group 10 includes the five participant terminal apparatuses 10A to 10E. However, the number of participant terminal apparatuses is not limited as long as one or more participant terminal apparatuses are provided. Furthermore, the number of participants is not limited to five as long as there are two or more participants.

The server apparatus 20 is a computer apparatus which stores a lecture material or the like to be used for a lecture by video distribution and outputs (distributes) a corresponding lecture material or the like in accordance with requests from the participant terminal apparatuses 10A to 10E. The server apparatus 20 according to the first exemplary embodiment creates a "participant attention word" which is determined based on a word which is paid attention by many participants in the output lecture material. The details of a "participant attention word" will be described later.

The administrator terminal apparatus 30 is a computer apparatus which is assumed to be used by an administrator (for example, a teacher) who manages a lecture by video distribution. The administrator terminal apparatus 30 is used for management (registration, deletion, editing, etc.) of a lecture material or the like stored in the server apparatus 20.

In the video distribution system 1 according to the first exemplary embodiment, when any one of the participant terminal apparatuses 10A to 10E acquires a lecture material from the server apparatus 20 via the network 40 and reproduces the acquired lecture material, a participant who uses the corresponding one of the participant terminal apparatuses 10A to 10E studies using the lecture material. Furthermore, in the video distribution system 1, the participant terminal apparatuses 10A to 10E are able to acquire and reproduce the same lecture material.

Furthermore, in the video distribution system 1 according to the first exemplary embodiment, the participant terminal apparatuses 10A to 10E receive input of a character string (hereinafter, referred to as "description of a note") to the lecture material that is currently being reproduced from corresponding participants, and output the received input to the server apparatus 20 via the network 40. Then, the server apparatus 20 stores the received contents of description of the notes in association with the corresponding participants, analyzes the contents of description of the notes by multiple participants who receive (view) the same lecture material, and acquires a "participant attention word" in the lecture material. The "participant attention word" acquired by the server apparatus 20 is transmitted to the participant terminal apparatuses 10A to 10E used by the participants who are receiving (viewing) the lecture material.

(Functional Configuration of Server Apparatus)

Figure 2:
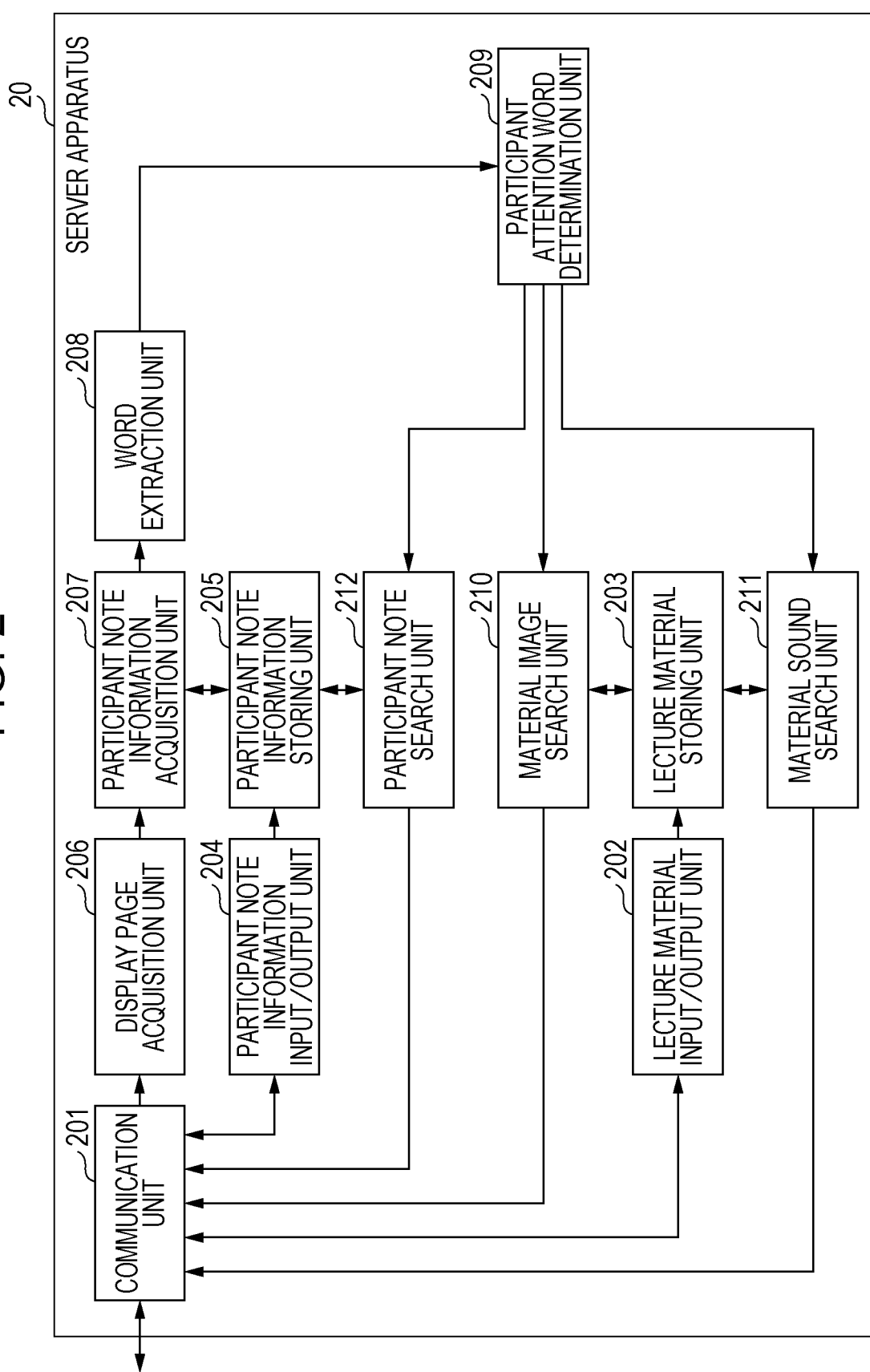
FIG. 2 is a functional block diagram of a server apparatus according to a first exemplary embodiment.

FIG. 2 is a functional block diagram of the server apparatus 20 according to the first exemplary embodiment.

The server apparatus 20 according to the first exemplary embodiment includes a communication unit 201, a lecture material input/output unit 202, a lecture material storing unit 203, a participant note information input/output unit 204, a participant note information storing unit 205, a display page acquisition unit 206, a participant note information acquisition unit 207, a word extraction unit 208, a participant attention word determination unit 209, a material image search unit 210, a material sound search unit 211, and a participant note search unit 212.

The communication unit 201 communicates with external apparatuses such as the participant terminal apparatuses 10A to 10E, the administrator terminal apparatus 30, and the like (see FIG. 1) via the network 40.

The lecture material input/output unit 202 inputs (writes) a lecture material to the lecture material storing unit 203 in accordance with a lecture material input request (write request) received via the communication unit 201. The lecture material input/output unit 202 also outputs (reads) a lecture material from the lecture material storing unit 203 in accordance with a lecture material output request (read request) received via the communication unit 201.

The lecture material storing unit 203 stores a lecture material and the like to be used for video distribution. Normally, lecture materials of different contents are stored in the lecture material storing unit 203. The details of lecture materials will be described later.

The participant note information input/output unit 204 inputs (writes) participant note information to the participant note information storing unit 205 in accordance with an input request (write request) for description contents of a note of each participant (referred to as participant note information), the input request (write request) being received via the communication unit 201. The participant note information input/output unit 204 also outputs (reads) participant note information from the participant note information storing unit 205 in accordance with a participant note information output request (read request) received via the communication unit 201.

The participant note information storing unit 205 stores participant note information to be used for video distribution. The details of participant note information will be described later.

The display page acquisition unit 206 acquires a page that is currently being displayed, that is, a display page, of a lecture material displayed at a participant terminal apparatus (for example, the participant terminal apparatus 10A) from the participant terminal apparatus to which the lecture material is output via the communication unit 201.

The participant note information acquisition unit 207 acquires from the participant note information storing unit 205 description contents of notes of all the participants (for example, five participants: the first participant A to the fifth participant E) in the display page acquired by the display page acquisition unit 206.

The word extraction unit 208 extracts a word from the description contents of the notes of all the participants (for example, five participants: the first participant A to the fifth participant E) acquired by the participant note information acquisition unit 207.

The participant attention word determination unit 209 further extracts a word with a high appearance frequency (referred to as a frequent word) from the words extracted by the word extraction unit 208 (referred to as extraction words) to determine a participant attention word which is estimated to be paid high attention by each participant.

The material image search unit 210 reads image text information in a display page of a corresponding lecture material from the lecture material storing unit 203. The material image search unit 210 also searches read image text information in a display page for a participant attention word determined by the participant attention word determination unit 209 and performs various types of processing associated with the search. The details of image text information will be described later.

The material sound search unit 211 reads audio text information in a display page of a corresponding lecture material from the lecture material storing unit 203. The material sound search unit 211 also searches read audio text information in a display page for a participant attention word determined by the participant attention word determination unit 209 and performs various types of processing associated with the search. The details of audio text information will be described later.

The participant note search unit 212 reads participant note information in a display page of a corresponding participant from the participant note information storing unit 205. The participant note search unit 212 also searches read participant note information in a display page of a participant for a participant attention word determined by the participant attention word determination unit 209 and performs various types of processing associated with the search.

[Functional Configuration of Participant Terminal Apparatus]

Figure 3A:
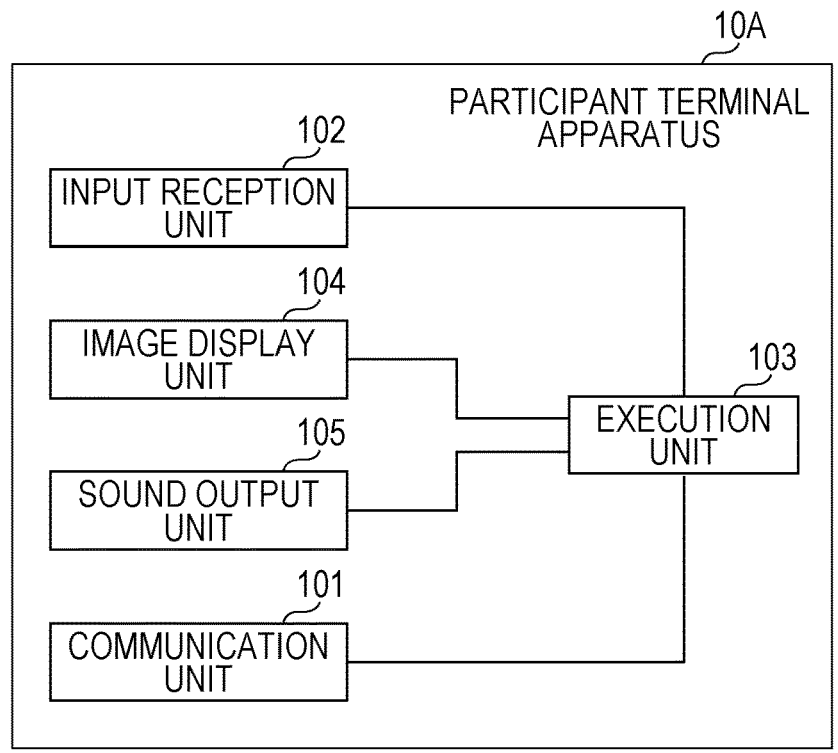
FIG. 3A is a functional block diagram of a participant terminal apparatus.

FIG. 3A is a functional block diagram of the participant terminal apparatus 10A illustrated in FIG. 1.

The participant terminal apparatus 10A includes a communication unit 101, an input reception unit 102, an execution unit 103, an image display unit 104, and a sound output unit 105.

The communication unit 101 communicates with external apparatuses such as the server apparatus 20, the administrator terminal apparatus 30, and the like (see FIG. 1) via the network 40.

The input reception unit 102 receives an input operation by a participant (for example, the first participant A).

The execution unit 103 executes various programs in accordance with an input operation by a participant received by the input reception unit 102 and controls individual units forming the participant terminal apparatus 10A.

The image display unit 104 displays images under the control of the execution unit 103.

The sound output unit 105 outputs sound under the control of the execution unit 103.

Detailed explanation for the configuration of the other participant terminal apparatuses 10B to 10E, which form the participant terminal apparatus group 10 together with the participant terminal apparatus 10A, will be omitted. The participant terminal apparatuses 10B to 10E also have the same configuration of the participant terminal apparatus 10A.

[Functional Configuration of Administrator Terminal Apparatus]

Figure 3B:
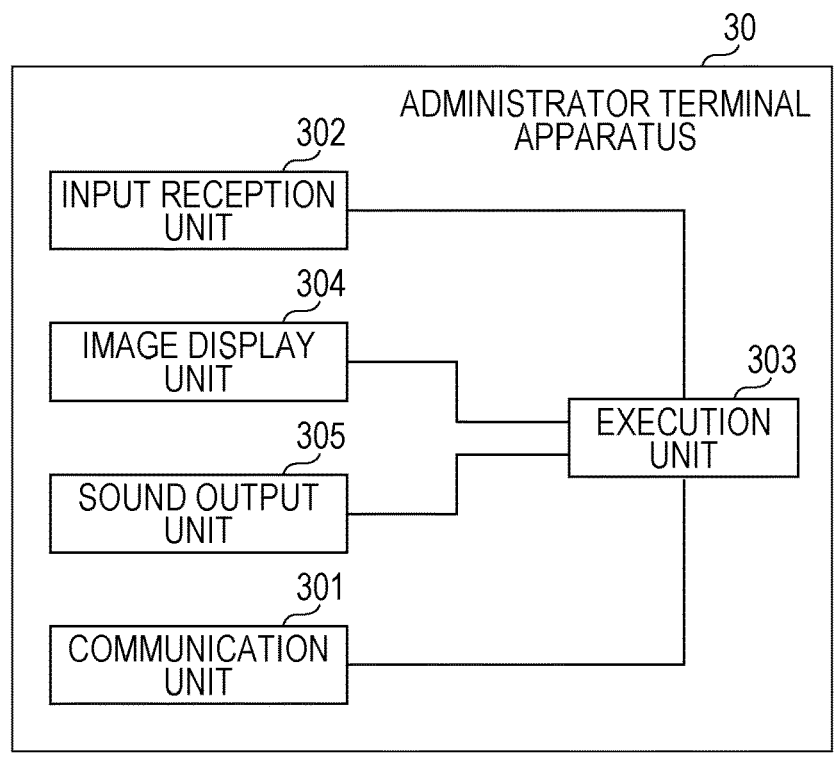
FIG. 3B is a functional block diagram of an administrator terminal apparatus.

FIG. 3B is a functional block diagram of the administrator terminal apparatus 30 illustrated in FIG. 1.

The administrator terminal apparatus 30 includes a communication unit 301, an input reception unit 302, an execution unit 303, an image display unit 304, and a sound output unit 305.

The communication unit 301 communicates with external apparatuses such as the participant terminal apparatuses 10A to 10E, the server apparatus 20, and the like (see FIG. 1) via the network 40.

The input reception unit 302 receives an input operation by an administrator.

The execution unit 303 executes various programs in accordance with an input operation by an administrator received by the input reception unit 302 and controls individual units forming the administrator terminal apparatus 30.

The image display unit 304 displays images under the control of the execution unit 303.

The sound output unit 305 outputs sound under the control of the execution unit 303.

The participant terminal apparatuses 10A to 10E which form the participant terminal apparatus group 10, the server apparatus 20, and the administrator terminal apparatus 30 are computer apparatuses. Each of the computer apparatuses includes a central processing unit (CPU) which reads and executes an operating system (OS) and various programs, a read only memory (ROM) which stores a program to be executed by the CPU and data and the like to be used when the program is executed, and a random access memory (RAM) which stores data and the like temporarily generated when a program is executed. A program to be executed by the CPU of the computer apparatus may be, for example, stored in a storing medium such as a compact disc-read only memory (CD-ROM) and provided or provided to the CPU via the network 40, as well as being stored in advance in the ROM.

[Lecture Material Management Table]

FIG. 4 is a diagram illustrating an example of a configuration of a lecture material management table which is used by the server apparatus 20 to manage various lecture materials to be output (distributed) to the participant terminal apparatuses 10A to 10E. The lecture material management table and files explained below are stored in the lecture material storing unit 203 provided at the server apparatus 20 (see FIG. 2).

In the lecture material management table illustrated in FIG. 4, "lecture material data", which provides association among the title of a lecture material (lecture) (referred to as a lecture title), information of an image (referred to as material image information), information of sound (referred to as material sound information), and synchronization information for providing synchronization (linkage) between an image and sound, is registered. The material image information includes a file path of an image file including image data and a file of an image text file including text of document information existing in the image file. The material sound information includes a file path of an audio file (or a moving image file with sound) including audio (or moving image with sound) data and a file path of an audio text file including text of document information existing in the audio file. The synchronization information includes a file path of a synchronization file (referred to as a synchronization file path) for providing synchronization between a reproduction time of an image using an image file and a reproduction time of sound using an audio file. In the example illustrated in FIG. 4, lecture titles "Geography (Shikoku)" and "Geography (Kyushu)" are registered in the lecture material management table.

[Lecture Material]

FIG. 5 is a diagram illustrating an example of a lecture material. FIG. 5 illustrates a lecture material of "Geography (Shikoku)" of the two lecture titles ("Geography (Shikoku)" and "Geography (Kyushu)") registered in the lecture material management table illustrated in FIG. 4.

A lecture material in the first exemplary embodiment is reproduced while an image file including an image and audio file including sound being synchronized (linked) with each other using a synchronization file illustrated in FIG. 4 at a participant terminal apparatus (for example, the participant terminal apparatus 10A). Accordingly, images displayed based on the image file are sequentially switched in accordance with the lapse of reproduction time of sound output based on the audio file.

The lecture material of "Geography (Shikoku)" illustrated in FIG. 5 includes, as described above, material image information including an image file and an image text file, material sound information including an audio file and an audio text file, and synchronization information (not illustrated in FIG. 5) which provides synchronization (association) between the material image information and the material sound information.

In this example, an image file forming material image information is a slide image including multiple pages each including a still image. In FIG. 5, the first to third pages of multiple pages forming an image file are illustrated, and description of the fourth and later pages is omitted. Furthermore, in FIG. 5, the detailed description of the third page is omitted.

In this example, the first page of the image file forming the material image information is a front cover. In the image text file, which forms the material image information together with the image file, two words "geography" and "Shikoku" which are extracted as characters from the first page of the image file are registered in association with the first page of the image file. Furthermore, in the audio file forming the material sound information, sound "Now, we'll study geography of Shikoku." is registered in association with the first page of the image file. Furthermore, in the audio text file, which forms the material sound information together with the audio file, three words "Shikoku", "geography", and "study" extracted as characters from the audio file corresponding to the first page of the image file are registered in association with the first page of the image file.

Furthermore, in this example, the second page of the image file forming the material image information is a diagram illustrating comparison results of the prefectures constituting Shikoku. In the image text file, which forms the material image information together with the image file, nine words including "Shikoku" and so on extracted as characters from the second page of the image file are registered in association with the second page of the image file. Furthermore, in the audio file forming material sound information, sound "Shikoku . . . " is registered in association with the second page of the image file. Furthermore, in an audio text file, which forms material sound information together with the audio file, sixteen words including "Shikoku" and so on extracted as characters from the audio file corresponding to the second page of the image file are registered in association with the second page of the image file.

[Participant Note Management Table]

FIG. 6 is a diagram illustrating an example of a configuration of a participant note management table for managing description contents of notes of all the participants using the video distribution system 1. The participant note management table is stored in the participant note information storing unit 205 provided at the server apparatus 20 (see FIG. 2).

In the participant note management table illustrated in FIG. 6, "participant note management information", which provides association among a participant, a lecture title to be received, and description contents of a note input to each page of an image file of the lecture title, is registered. The participant note management table in the first exemplary embodiment is created for each lecture title. A participant note management table of the lecture title "Geography (Shikoku)" which is received by the first participant A to the fifth participant E is illustrated in FIG. 6. In FIG. 6, the first to third pages of multiple pages forming an image file are illustrated, and description of the fourth and later pages is omitted. Furthermore, in FIG. 6, the detailed description of the third page is omitted.

In this example, the first participant A does not input anything to the first page (blank) and inputs "Kagawa Prefecture is Udon Prefecture." to the second page. The second participant B does not input anything to the first page (blank) and inputs "Ehime Prefecture is famous for oranges. Kagawa Udon Prefecture" to the second page. The third participant C does not input anything to the first page (blank) and inputs "Ehime Prefecture has the largest population." to the second page. The fourth participant D does not input anything to the first page (blank) and inputs "Kochi Prefecture has a large area." to the second page. The fifth participant E does not input anything to the first page (blank) and does not input anything to the second page (blank).

[UI Screen Displayed at Participant Terminal Apparatus]

Figure 7:
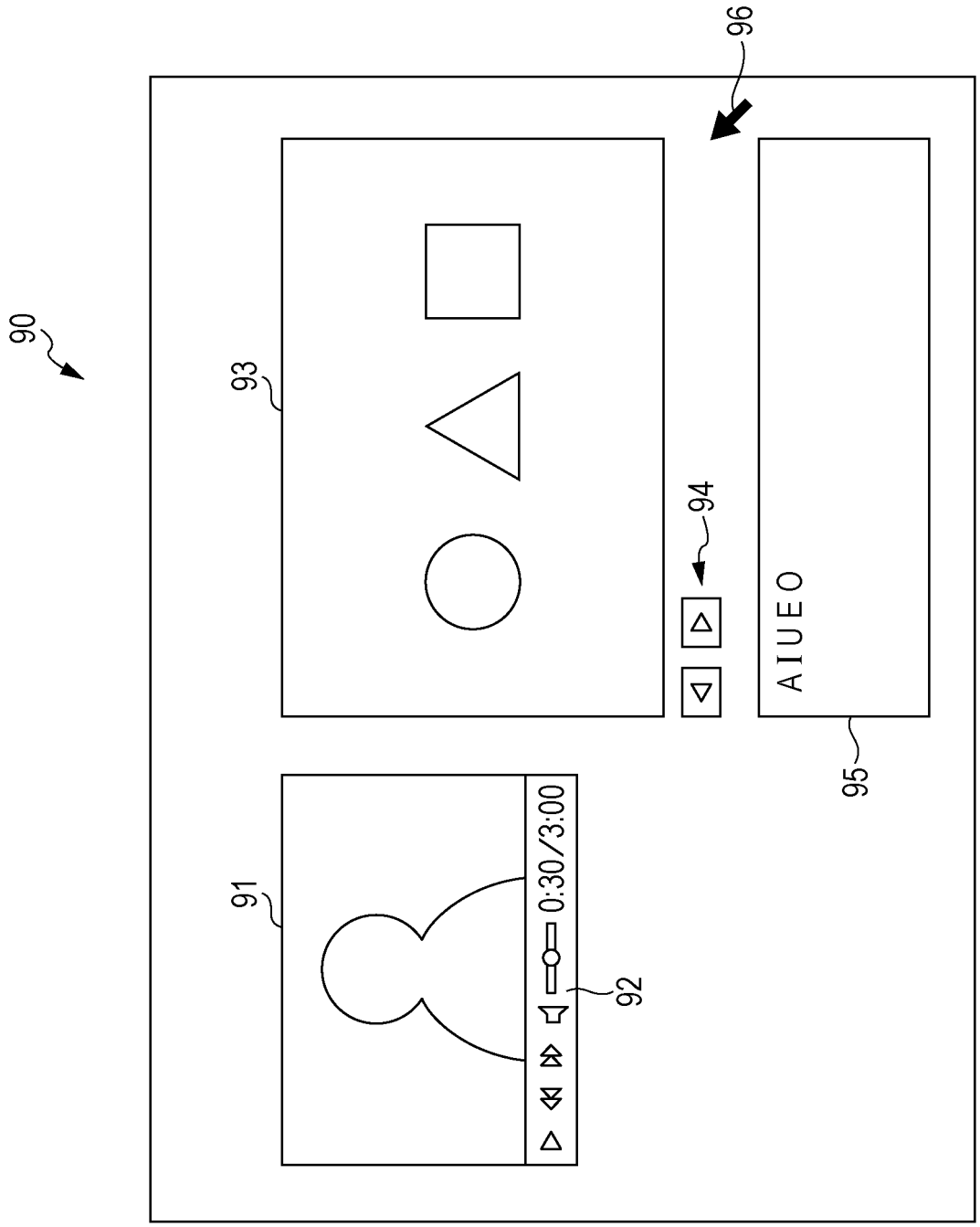
FIG. 7 is a diagram illustrating an example of a configuration of a UI screen displayed on a participant terminal apparatus.

FIG. 7 is a diagram illustrating an example of a configuration of a user interface (UI) screen 90 displayed at (the image display unit 104 (see FIG. 3A)) of the participant terminal apparatuses 10A to 10E in the video distribution system 1 according to the first exemplary embodiment.

The UI screen 90 includes a video display unit 91 arranged in an upper left part of the screen and a video/audio operation reception unit 92 arranged below the video display unit 91. The UI screen 90 also includes a slide display unit 93 arranged on the right of the video display unit 91 and the video/audio operation reception unit 92, a slide operation reception unit 94 arranged on the lower left of the slide display unit 93, and a note display unit 95 arranged below the slide display unit 93. In FIG. 7, a pointer 96 which moves within the UI screen 90 in accordance with an operation of the input reception unit 102 (see FIG. 3A) is also illustrated.

In the case where an audio file specified by an audio file path of material sound information (see FIG. 4) forming a lecture material is a file of a moving image with sound, the video display unit 91 displays the moving image. For example, when "Geography (Shikoku)" is selected as a lecture title, a moving image (video) specified by an audio file path "C:\video\shikoku.wmv" is displayed on the video display unit 91.

The video/audio operation reception unit 92 receives an operation (reproduction, pause, fast-forwarding, rewinding, volume control, etc.) regarding reproduction of a moving image displayed on the video display unit 91 and/or sound output from the sound output unit 105 (see FIG. 3A) via the pointer 96 from a participant.

The slide display unit 93 displays an image file specified by an image file path of material image information forming a lecture material (see FIG. 4). For example, when "Geography (Shikoku)" is selected as a lecture title, an image (slide) specified by an image file path "C:\slide\shikoku.ppt" is displayed on the slide display unit 93.

The slide operation reception unit 94 receives an operation (display of the previous page, display of the next page, etc.) regarding display of an image displayed on the slide display unit 93 via the pointer 96 from a participant.

The note display unit 95 displays character information, that is, description contents of a note, input via the input reception unit 102 (keyboard etc.) from a participant on the UI screen 90 while a moving image, an image, sound, and the like based on a lecture material are being displayed/output (regardless of reproduction or pause).

In the first exemplary embodiment, each of the participants A to E corresponds to a viewer, the server apparatus 20 corresponds to an information processing apparatus, and the video distribution system 1 corresponds to an information processing system. Furthermore, in the first exemplary embodiment, the participant note information input/output unit 204 functions as an example of an acquisition unit, the word extraction unit 208 and the participant attention word determination unit 209 function as an example of an extraction unit, and the material image search unit 210 and the material sound search unit 211 function as an example of a changing unit. Furthermore, in the first exemplary embodiment, participant note information functions as an example of character information, and a participant attention word, which is a frequently appearing word, functions as a frequent word. Furthermore, in the first exemplary embodiment, the input reception unit 102 functions as an acquisition unit, and the image display unit 104 and the sound output unit 105 function as a representation unit.

[Attention Word Extraction Process]

Figure 8:
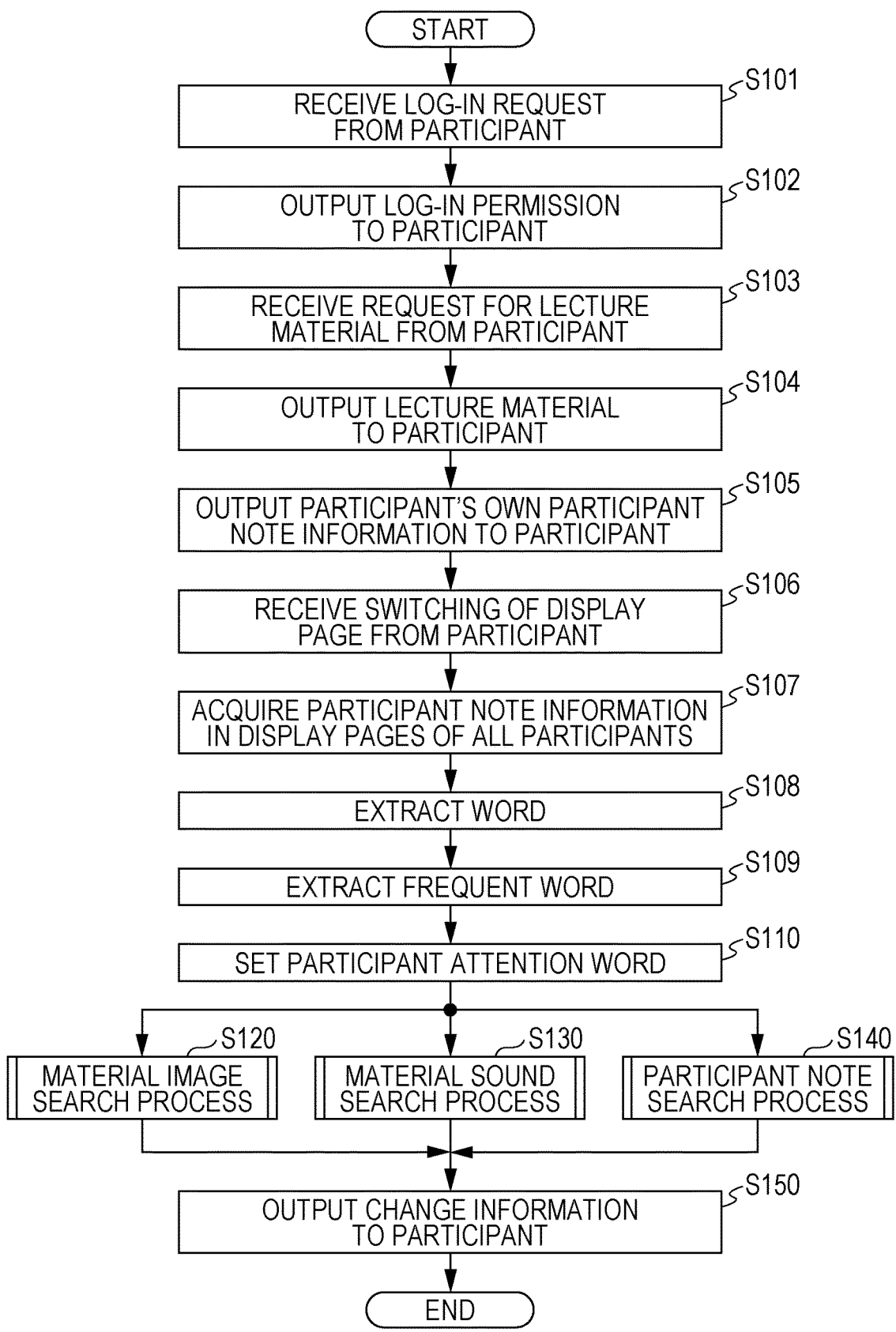
FIG. 8 is a flowchart illustrating the flow of an attention word extraction process (principal routine) according to the first exemplary embodiment.

FIG. 8 is a flowchart illustrating the flow of an attention word extraction process (principal routine) according to the first exemplary embodiment. This process (program) is executed by the server apparatus 20. Explanation for a case where the first participant A who uses the participant terminal apparatus 10A receives a lecture based on a lecture material (video distribution) will be provided as an example.

First, the server apparatus 20 receives a log-in request from a participant (in this example, the first participant A) from any of the participant terminal apparatuses 10A to 10E (in this example, the participant terminal apparatus 10A) (step S101). In the case where the first participant A is registered as a participant, the server apparatus 20 outputs permission for log-in to the participant terminal apparatus 10A from which the log-in request is received (step S102). Then, the server apparatus 20 receives a lecture material request from the participant terminal apparatus 10A which is permitted to log in (step S103). At this time, the server apparatus 20 receives the name of a lecture title of the lecture material.

At the server apparatus 20, the lecture material input/output unit 202 reads the lecture material of the lecture title requested in step S103 from various lecture materials stored in the lecture material storing unit 203, and outputs the read lecture material to the participant terminal apparatus 10A (step S104). Furthermore, at the server apparatus 20, the participant note information input/output unit 204 reads participant note information associated with the lecture title requested in step S103 of the participant (first participant A) who is permitted to log in in step S102 from various types of participant note information stored in the participant note information storing unit 205, and outputs the read participant note information to the participant terminal apparatus 10A (step S105). Accordingly, the lecture material and the participant note information of the first participant A associated with the lecture material are provided to the participant terminal apparatus 10A.

Next, the server apparatus 20 receives switching of a display page of an image file forming the lecture material (a page being displayed on the slide display unit 93 of the UI screen 90) at the participant terminal apparatus 10A with which the first participant A is receiving a lecture by video distribution (step S106). Then, when the server apparatus 20 receives switching of the display page of the image file, the participant note information acquisition unit 207 receives participant note information in the display page of all the participants who are registered as participants for video distribution based on the lecture material output in step S104 (in this example, five participants: the first participant A to the fifth participant E) from various types of participant note information stored in the participant note information storing unit 205 (step S107).

Then, the word extraction unit 208 provided at the server apparatus 20 extracts a word, based on description of notes in the participant note information of all the participants acquired in step S107 (step S108). Then, the participant attention word determination unit 209 provided at the server apparatus 20 extracts a frequent word with a high appearance frequency from the one or more extraction words extracted in step S108 (step S109), and sets the acquired frequent word as a participant attention word (step S110).

Then, at the server apparatus 20, the material image search unit 210 performs a "material image search process" for searching material image information (more specifically, an image text file) in the display page of the lecture material for the participant attention word as a search word (step S120). Furthermore, at the server apparatus 20, the material sound search unit 211 performs a "material sound search process" for searching material sound information (more specifically, an audio text file) in the display page of the lecture material for the participant attention word as a search word (step S130). Furthermore, at the server apparatus 20, the participant note search unit 212 performs a "participant note search process" for searching participant note information of all the participants in the display page of the lecture material for the participant attention word as a search word (step S140).

Then, after the "material image search process" in step S120, the "material sound search process" in step S130, and the "participant note search process" in step S140 are completed, the server apparatus 20 outputs to the participant terminal apparatus 10A change information based on search results of the above search processes (step S150). Then, the series of processes is completed.

Now, the above three sub-routines (the "material image search process", the "material sound search process", and the "participant note search process") in the attention word extraction process will be described in order.

(Material Image Search Process)

Figure 9:
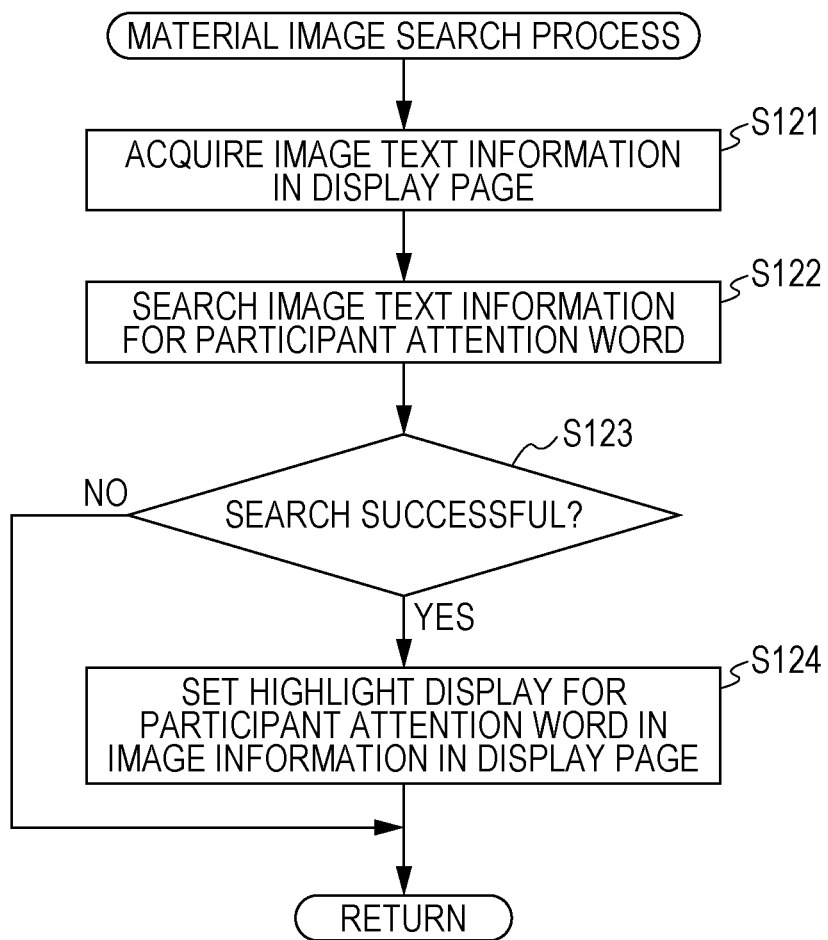
FIG. 9 is a flowchart illustrating the flow of a material image search process (first sub-routine) according to the first exemplary embodiment.

FIG. 9 is a flowchart illustrating the flow of the material image search process (first sub-routine: step S120) according to the first exemplary embodiment.

In this process, first, the material image search unit 210 acquires image text information in the display page acquired in step S107 from the lecture material of the lecture title requested in step S103 stored in the lecture material storing unit 203 (step S121). Next, the material image search unit 210 searches the image text information in the display page acquired in step S121 for the participant attention word set in step S110 (step S122). Then, the material image search unit 210 determines whether or not search is successful, that is, whether or not the participant attention word is present in the image text information in the display page (step S123). In the case where the determination result in step S123 is affirmative (YES), the material image search unit 210 sets "highlight display" (an example of a representation form) for the participant attention word in the image information in the display page (step S124). Then, the process returns to the principal routine illustrated in FIG. 8. In contrast, in the case where the determination result in step S123 is negative (NO), the material image search unit 210 does not perform any processing. The process directly returns to the principal routine illustrated in FIG. 8.

(Material Sound Search Process)

Figure 10:
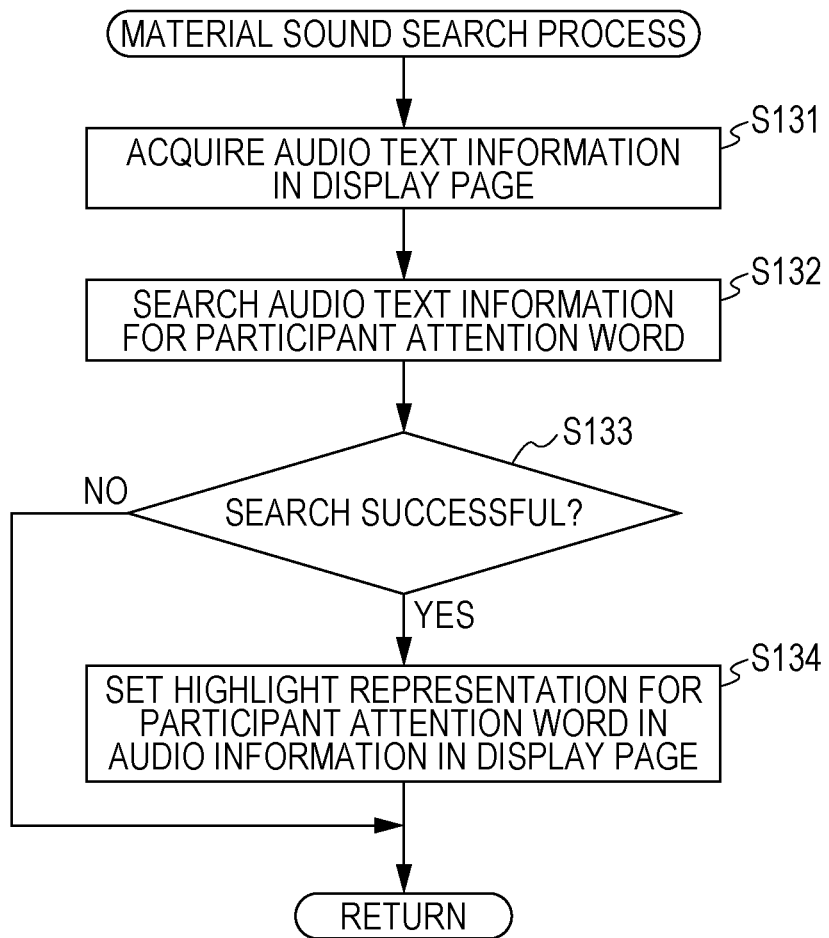
FIG. 10 is a flowchart illustrating the flow of a material sound search process (second sub-routine) according to the first exemplary embodiment.

FIG. 10 is a flowchart illustrating the flow of a material sound search process (second sub-routine: step S130) according to the first exemplary embodiment.

In this process, first, the material sound search unit 211 acquires audio text information in the display page acquired in step S107 from the lecture material of the lecture title requested in step S103 stored in the lecture material storing unit 203 (step S131). Next, the material sound search unit 211 searches the audio text information in the display page acquired in step S131 for the participant attention word set in step S110 (step S132). Then, the material sound search unit 211 determines whether or not search is successful, that is, whether or not the participant attention word is present in the audio text information in the display page (step S133). In the case where the determination result in step S133 is affirmative (YES), the material sound search unit 211 sets "highlight representation" (an example of a representation form) for the participant attention word in the audio information in the display page (step S134). Then, the process returns to the principal routine illustrated in FIG. 8. In contrast, in the case where the determination result in step S133 is negative (NO), the material sound search unit 211 does not perform any processing. The process directly returns to the principal routine illustrated in FIG. 8.

(Participant Note Search Process)

Figure 11:
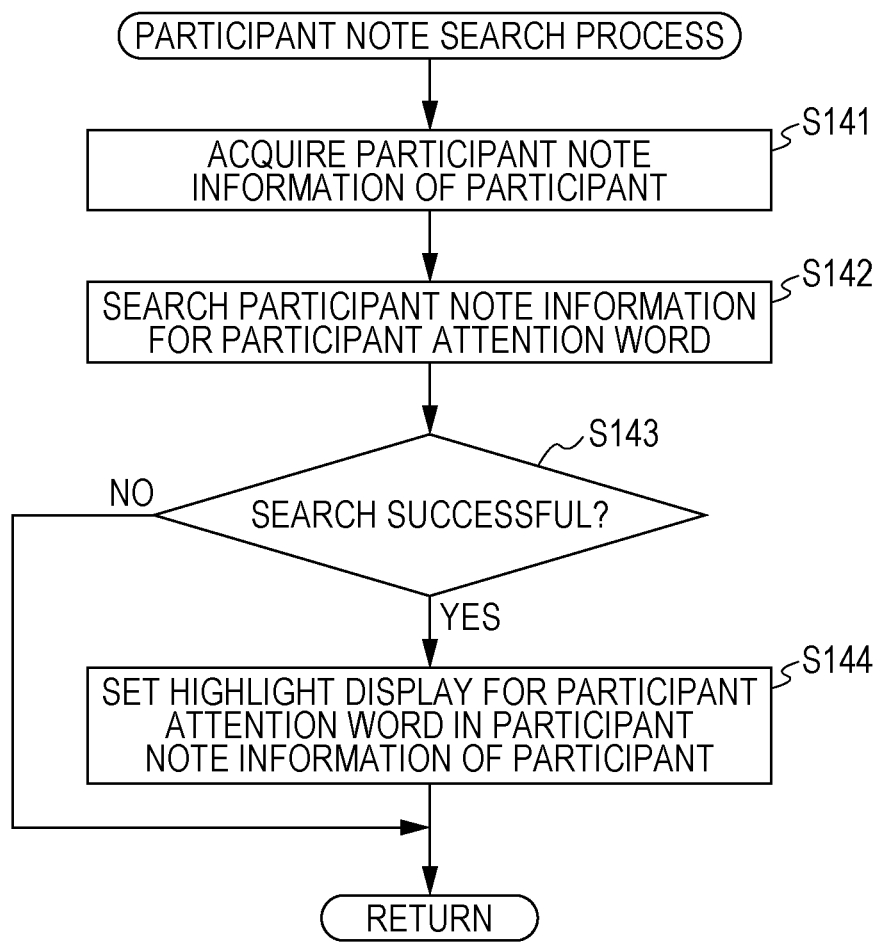
FIG. 11 is a flowchart illustrating the flow of a participant note search process (third sub-routine) according to the first exemplary embodiment.

FIG. 11 is a flowchart illustrating the flow of a participant note search process (third sub-routine: step S140) according to the first exemplary embodiment.

In this process, first, the participant note search unit 212 acquires participant note information in the display page acquired in step S107 from the lecture material of the lecture title requested in step S103 from participant note information of the participant (first participant A) to which log-in permission is output in step S102 stored in the participant note information storing unit 205 (step S141). Next, the participant note search unit 212 searches the participant note information of the participant in the display page acquired in step S141 for the participant attention word set in step S110 (step S142). Then, the participant note search unit 212 determines whether or not search is successful, that is, whether or not the participant attention word is present in the participant note information of the participant in the display page (step S143). In the case where the determination result in step S143 is affirmative (YES), the participant note search unit 212 sets "highlight display" (an example of a representation form) for the participant attention word in the participant note information of the participant in the display page (step S144). Then, the process returns to the principal routine illustrated in FIG. 8. In contrast, in the case where the determination result in step S143 is negative (NO), the participant note search unit 212 does not perform any processing. The process directly returns to the principal routine illustrated in FIG. 8.

[Attention Word Acquisition Process]

Figure 12:
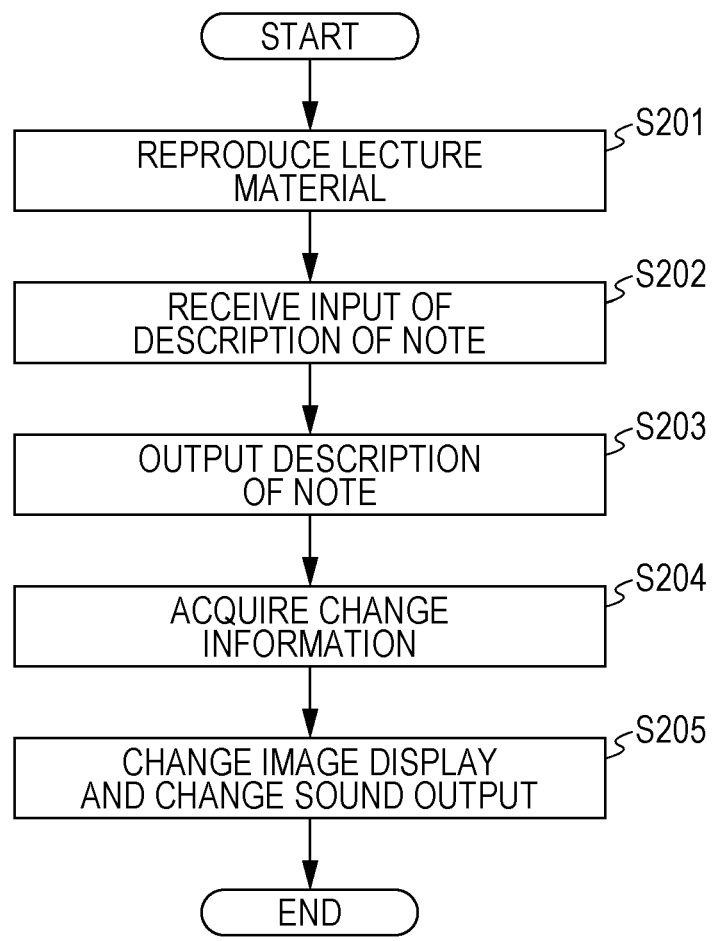
FIG. 12 is a flowchart illustrating the flow of an attention word acquisition process according to the first exemplary embodiment.

FIG. 12 is a flowchart illustrating the flow of an attention word acquisition process according to the first exemplary embodiment. This process (program) is executed by each of the participant terminal apparatuses 10A to 10E. Explanation for a case where the first participant A who uses the participant terminal apparatus 10A receives a lecture based on a lecture material (video distribution) will be provided as an example.

First, the participant terminal apparatus 10A reproduces the lecture material output from the server apparatus 20 in step S104 (see FIG. 8) using the image display unit 104 and the sound output unit 105 (step S201). Next, the participant terminal apparatus 10A receives description of a note regarding the lecture material that is being reproduced (input of character information to the note display unit 95: participant note information) via the input reception unit 102 (step S202), and outputs the received description of the note to the server apparatus 20 via the network 40 (step S203). Then, the participant terminal apparatus 10A acquires change information output from the server apparatus 20 in step S150 (see FIG. 8) (step S204), and changes image display and sound output in the lecture material that is being reproduced, based on the acquired change information (step S205). Then, the series of processes is completed.

[Specific Example of Attention Word Extraction Process]

The details of the attention word extraction process according to the first exemplary embodiment will be described below by way of two specific examples.

(First Specific Example)

As a first specific example of the first exemplary embodiment, a case where the first participant A receives (views) a lecture with the lecture title of "Geography (Shikoku)" using the participant terminal apparatus 10A will be described. In addition, in the first specific example, the first participant A who uses the participant terminal apparatus 10A switches the display page of an image file displayed on the UI screen 90 (more specifically, the slide display unit 93) from the first page to the second page while receiving (viewing) the lecture title "Geography (Shikoku)". The above assumption is also applied to a first specific example of a second exemplary embodiment and a first specific example of a third exemplary embodiment, which will be described later.

FIGS. 13A to 13C are diagrams for explaining the first specific example of the first exemplary embodiment.

FIG. 13A is a diagram illustrating the state of the image display unit 104 (upper part) and the state of the sound output unit 105 (lower part) of the participant terminal apparatus 10A used by the first participant A in the case where the attention word acquisition process illustrated in FIG. 12 is not performed. In the image display unit 104 illustrated in FIG. 13A, the slide display unit 93 and the note display unit 95 are extracted from the UI screen 90 illustrated in FIG. 7. This is also applied to FIG. 13C, which will be described later.

FIG. 13A illustrates a state in which image display and sound output corresponding to the second page of an image file of the lecture material with the lecture title of "Geography (Shikoku)" illustrated in FIG. 6 are being performed. Therefore, at the participant terminal apparatus 10A, an image indicating comparison results of the prefectures constituting Shikoku is displayed on the slide display unit 93 of the image display unit 104, and sound "Shikoku . . . " is output from the sound output unit 105 in synchronization with the display of the image. Furthermore, on the note display unit 95 of the image display unit 104 illustrated in FIG. 13A, "Kagawa Prefecture is Udon Prefecture.", which is description of a note corresponding to the second page of the image file of the lecture material with the lecture title of "Geography (Shikoku)" illustrated in FIG. 5 of participant note information of the first participant A illustrated in FIG. 6, is displayed.

At this time, the first participant A who uses the participant terminal apparatus 10A inputs characters (describes a note) to the note display unit 95 as necessary while viewing the image displayed on the slide display unit 93 of the image display unit 104 and listening to the sound output from the sound output unit 105.

FIG. 13B is a diagram illustrating participant note information (upper part) corresponding to the second page of the image file of all the participants who receive the lecture title "Geography (Shikoku)" (in this example, five participants: the first participant A to the fifth participant E), extraction words (middle part) extracted from the participant note information corresponding to the second page of the image file of all the participants, and frequent words (lower part) further extracted from the extraction words. In this example, the frequent words illustrated in the lower part of FIG. 13B directly serve as participant attention words.

In this case, as illustrated in the upper part of FIG. 13B, description of the note of the first participant A is "Kagawa Prefecture is Udon Prefecture.", description of the note of the second participant B is "Ehime Prefecture is famous for oranges. Kagawa Udon Prefecture", description of the note of the third participant C is "Ehime Prefecture has the largest population.", description of the note of the fourth participant D is "Kochi Prefecture has a large area.", and description of the note of the fifth participant E is "(blank)" (see FIG. 6). Furthermore, in this case, as illustrated in the middle part of FIG. 13B, the extraction words are "Ehime (2), Kagawa (2), Udon Prefecture (2), oranges (1), population (1), Kochi (1), and area (1)" (numbers in brackets represent the number of appearance times (frequency)". Furthermore, in this case, as illustrated the lower part of FIG. 13B, the frequent words, that is, the participant attention words, are three words: "Ehime, Kagawa, Udon Prefecture".

FIG. 13C is a diagram illustrating the state of the image display unit 104 (upper part) and the sound output unit 105 (lower part) of the participant terminal apparatus 10A used by the first participant A after the attention word acquisition process illustrated in FIG. 12 is performed.

FIG. 13C corresponds to FIG. 13A, and illustrates a state in which image display and sound output corresponding to the second page of the image file of the lecture material with the lecture title of "Geography (Shikoku)" illustrated in FIG. 5 are being performed. Therefore, at the participant terminal apparatus 10A, an image indicating comparison results of the prefectures constituting Shikoku is displayed on the slide display unit 93 of the image display unit 104, and sound "Shikoku . . . " is output from the sound output unit 105 in synchronization with the display of the image. Furthermore, on the note display unit 95 of the image display unit 104 illustrated in FIG. 13C, "Kagawa Prefecture is Udon Prefecture.", which is description of the note corresponding to the second page of the image file of the lecture material with the lecture title of "Geography (Shikoku)" illustrated in FIG. 5 of the participant note information of the first participant A illustrated in FIG. 6, is displayed.

In the first exemplary embodiment, in accordance with execution of the attention word extraction process illustrated in FIG. 8, the material image search process illustrated in FIG. 9 is performed (step S120), and "highlight display" is set for the participant attention word in the image information in the display page (step S124). Therefore, the participant attention word in the image of the second page displayed on the slide display unit 93 of the image display unit 104 illustrated in FIG. 13C is displayed in a highlighted manner compared to the original state. In this example, for highlight display of a character, a method for increasing the font size of the character and emphasizing the character (bold character) compared to the original state is adopted.

Furthermore, in the first exemplary embodiment, in accordance with execution of the attention word extraction process illustrated in FIG. 8, the material sound search process illustrated in FIG. 10 is performed (step S130), and "highlight representation" is set for the participant attention word in the audio information in the display page (step S134). Therefore, the participant attention word (a portion surrounded by a frame in the sound output unit 105 illustrated in FIG. 13C) of the sound in the second page output from the sound output unit 105 illustrated in FIG. 13C is represented in a highlighted manner compared to the original state. In this example, for highlight representation of speech, a method for providing a sound effect (for example, a bell sound) at the background of the original speech is adopted.

Furthermore, in the first exemplary embodiment, in accordance with execution of the attention word extraction process illustrated in FIG. 8, the participant note search process illustrated in FIG. 11 is performed (step S140), and "highlight display" is set for the participant attention word in the participant note information of the participant in the display page (step S144). Therefore, the participant attention word of description of the note (character string) displayed on the note display unit 95 of the image display unit 104 illustrated in FIG. 13C is displayed in a highlighted manner compared to the original state. In this example, for highlight display of a character, a method for increasing the font size of the character and emphasizing the character (bold character) compared to the original state is adopted.

As a method for highlight display of a character, in addition to the above example, changing the display color of the character (for example, changing the color from black to red), adding an underline or frame to the character, and the like may be used. Furthermore, as a method for highlight representation of speech, in addition to the above example, changing the sound quality of speech (for example, changing the sound quality from a male voice to a female voice), increasing the sound volume of speech, and the like may be used.

In this example, with the use of the participant terminal apparatus 10A, the first participant A who receives (views) the lecture title "Geography (Shikoku)" is able to visually or audibly understand a participant attention word which is paid attention by all the participants (the first participant A to the fifth participant E) who are registered as participants for the lecture title "Geography (Shikoku)".

Specifically, first, by providing highlight display of a participant attention word in the second page of image information (image file) displayed on the slide display unit 93 of the image display unit 104 at the participant terminal apparatus 10A, the first participant A who views the second page of the image file pays more attention to the participant attention word.

Furthermore, by providing highlight representation of a participant attention word in audio information (audio file) corresponding to the second page of an image file output from the sound output unit 105 at the participant terminal apparatus 10A, the first participant A who listens to the audio file corresponding to the second page of the image file pays more attention to the participant attention word.

Furthermore, by providing highlight display of a participant attention word in participant note information of the participant corresponding to the second page of an image file displayed on the note display unit 95 of the image display unit 104 at the participant terminal apparatus 10A, the first participant A who views their own participant note information corresponding to the second page of the image file pays more attention to the participant attention word.

(Second Specific Example)

As a second specific example of the first exemplary embodiment, a case where the first participant A to the fifth participant E receive (view) a lecture with the lecture title of "Geography (Shikoku)" using the participant terminal apparatuses 10A to 10E will be described. In this example, each of the first participant A to the fifth participant E who use the participant terminal apparatuses 10A to 10E, respectively, switches the display page of an image file displayed on the UI screen 90 (more specifically, the slide display unit 93) from the first page to the second page while receiving (viewing) the lecture title "Geography (Shikoku)". The above assumption is also applied to a second specific example of the second exemplary embodiment and a second specific example of the third exemplary embodiment, which will be described later.

FIGS. 14A to 14E are diagrams for explaining the second specific example of the first exemplary embodiment. FIGS. 14A to 14E are diagrams illustrating the state of the image display unit 104 of the participant terminal apparatuses 10A to 10E used by the first participant A to the fifth participant E, respectively, after the attention word acquisition process illustrated in FIG. 12 is performed. On the image display unit 104 illustrated in FIGS. 14A to 14E, the slide display unit 93 and the note display unit 95 are extracted from the UI screen 90 illustrated in FIG. 7. This is also applied to FIGS. 16A to 16E and FIGS. 20A to 20E, which will be described later.

As in FIG. 13C, FIGS. 14A to 14E illustrate a state in which image display corresponding to the second page of an image file of the lecture material with the lecture title of "Geography (Shikoku)" illustrated in FIG. 6 is being performed.

In this case, an image indicating comparison results of the prefectures constituting Shikoku is displayed on the slide display unit 93 of the image display unit 104 at the participant terminal apparatuses 10A to 10E. When the material image search process illustrated in FIG. 9 is performed in the attention word extraction process illustrated in FIG. 8, a participant attention word of the image in the second page displayed on the slide display unit 93 of the image display unit 104 at the participant terminal apparatuses 10A to 10E is displayed in a highlighted manner compared to the original state. That is, on the image display unit 104 of the participant terminal apparatuses 10A to 10E, an image of the same contents (including highlight display) is displayed. Although detailed explanation is not provided here, in this case, sound of the same contents (including highlight representation) (described in the sound output unit 105 illustrated in FIG. 13C) is output from the sound output unit 105 of the participant terminal apparatuses 10A to 10E.

Furthermore, in this case, on the note display unit 95 of the image display unit 104 at each of the participant terminal apparatuses 10A to 10E, description of the participant's own note is displayed. When the participant note search process illustrated in FIG. 11 is performed in the attention word extraction process illustrated in FIG. 8, a participant attention word of the description of the participant's own note is displayed at each of the participant terminal apparatuses 10A to 10E in a highlighted manner compared to the original state. That is, on the image display unit 104 of the participant terminal apparatuses 10A to 10E, images of different contents are displayed depending on the participant.

In this case, with the use of the participant terminal apparatuses 10A to 10E, the first participant A to the fifth participant E who receive (view) the lecture title "Geography (Shikoku)" is able to visually and audibly understand a participant attention word which is paid attention by all the participants (the first participant A to the fifth participant E) who are registered as participants for the lecture title "Geography (Shikoku)".

Specifically, first, by providing highlight display of a participant attention word in the second page of image information (image file) displayed on the slide display unit 93 of the image display unit 104 at the participant terminal apparatuses 10A to 10E, the first participant A to the fifth participant E who view the second page of the image file pay more attention to the participant attention word.

Furthermore, by providing highlight representation of a participant attention word in audio information (audio file) corresponding to the second page of the image file output from the sound output unit 105 of the participant terminal apparatuses 10A to 10E, the first participant A to the fifth participant E who listen to the audio file corresponding to the second page of the image file pay more attention to the participant attention word.

Furthermore, by providing highlight display of a participant attention word in participant note information of the first participant A to the fifth participant E corresponding to the second page of the image file displayed on the note display unit 95 of the image display unit 104 at the corresponding participant terminal apparatuses 10A to 10E, the first participant A to the fifth participant E who view their own participant note information corresponding to the second page of the image file pay more attention to the participant attention word.

In this example, as illustrated in FIG. 14E, the fifth participant E who uses the participant terminal apparatus 10E does not input anything (blank) to the participant's own participant note information (description of a note to the note display unit 95) corresponding to the second page of the image file. At this time, on the slide display unit 93 displayed on the image display unit 104 together with the note display unit 95, the second page of the image file is displayed in a state in which a participant attention word is highlight-displayed, and an audio file corresponding to the second page of the image file is output from the sound output unit 105 in a state in which the participant attention word is highlight-represented. Accordingly, the fifth participant E who uses the participant terminal apparatus 10E is able to be prompted to describe a note in which the participant attention word is set as a keyword.

Second Exemplary Embodiment

In the first exemplary embodiment, for highlight display or highlight representation of a participant attention word, the participant attention word itself is highlighted. In contrast, in the second exemplary embodiment, as highlight display or highlight representation of a participant attention word, the participant attention word is hidden. In the second exemplary embodiment, the same parts as those in the first exemplary embodiment will be referred to with the same reference signs, and detailed explanation for those same parts will be omitted.

Furthermore, the procedure of the attention word extraction process and the attention word acquisition process according to the second exemplary embodiment is the same as that explained in the first exemplary embodiment.

[Specific Example of Attention Word Extraction Process]

Hereinafter, the details of the attention word extraction process according to the second exemplary embodiment will be described by way of two specific examples.

(First Specific Example)

FIGS. 15A to 15C are diagrams for explaining a first specific example of the second exemplary embodiment. FIGS. 15A and 15B are the same as FIGS. 13A and 13B which have been described above in the first exemplary embodiment. Therefore, the detailed explanation for FIGS. 15A and 15B will be omitted.

FIG. 15C is a diagram illustrating the state of the image display unit 104 (upper part) and the sound output unit 105 (lower part) at the participant terminal apparatus 10A used by the first participant A after the attention word acquisition process illustrated in FIG. 12 is performed.

FIG. 15C corresponds to FIG. 15A, and illustrates a state in which image display and sound output corresponding to the second page of an image file of a lecture material with the lecture title of "Geography (Shikoku)" illustrated in FIG. 5 are being performed.

In the second exemplary embodiment, a participant attention word in the image of the second page displayed on the slide display unit 93 of the image display unit 104 illustrated in FIG. 15C is displayed in a state in which each character is hidden with an image of "o".

Furthermore, in the second exemplary embodiment, a participant attention word of sound in the second page output from the sound output unit 105 illustrated in FIG. 15C is represented in a state in which the participant attention word is hidden as no sound (in FIG. 15C, represented by "o").

Furthermore, in the second exemplary embodiment, a participant attention word of description of a note (character string) displayed on the note display unit 95 of the image display unit 104 illustrated in FIG. 15C is displayed in a state in which each character is hidden with an image of "o".

As a method for hidden display of a character, in addition to the above example, filling a display region of the character with a specific color, hiding the entire display region of a character string with an image of, for example, a square, instead of hiding each character, and the like may be used. Furthermore, as a method for hidden representation of speech, in addition to the above example, providing a sound effect with a larger volume than the original speech, reversely reproducing the original speech, and the like may be used.

(Second Specific Example)

FIGS. 16A to 16E are diagrams for explaining the second specific example of the second exemplary embodiment. As in FIGS. 14A to 14E in the first exemplary embodiment described above, FIGS. 16A to 16E illustrate a state in which image display corresponding to the second page of an image file of the lecture material with the lecture title of "Geography (Shikoku)" illustrated in FIG. 5 is being performed.

In this case, on the slide display unit 93 of the image display unit 104 at the participant terminal apparatuses 10A to 10E, an image indicating comparison results of the prefectures constituting Shikoku is displayed. At the participant terminal apparatuses 10A to 10E, a participant attention word in the image in the second page displayed on the slide display unit 93 of the image display unit 104 is displayed in a state in which each character is hidden with an image of "o". That is, an image of the same contents (including hidden display) is displayed on the image display unit 104 of the participant terminal apparatuses 10A to 10E. Although the detailed explanation is not provided here, in this case, sound of the same contents (including hidden representation) (described in the sound output unit 105 illustrated in FIG. 13C) is output from the sound output unit 105 of the participant terminal apparatuses 10A to 10E.

Furthermore, in this case, on the note display unit 95 of the image display unit 104 at each of the participant terminal apparatuses 10A to 10E, description of the participant's own note is displayed. At each of the participant terminal apparatuses 10A to 10E, a participant attention word of the description of the participant's own note is displayed in a state in which each character is hidden with an image of "o". That is, on the image display unit 104 of the participant terminal apparatuses 10A to 10E, images of different contents are displayed depending on the participant.

Third Exemplary Embodiment

In the first exemplary embodiment, only a participant attention word is highlight-displayed or highlight-represented. In contrast, in the third exemplary embodiment, a word which is paid attention by an administrator who uses the administrator terminal apparatus 30 (see FIG. 1) (referred to as an administrator attention word) is further highlight-displayed or highlight-represented. In the third exemplary embodiment, the same parts as those in the first exemplary embodiment will be referred to with the same reference signs, and explanation for those same parts will be omitted.

[Functional Configuration of Server Apparatus]

Figure 17:
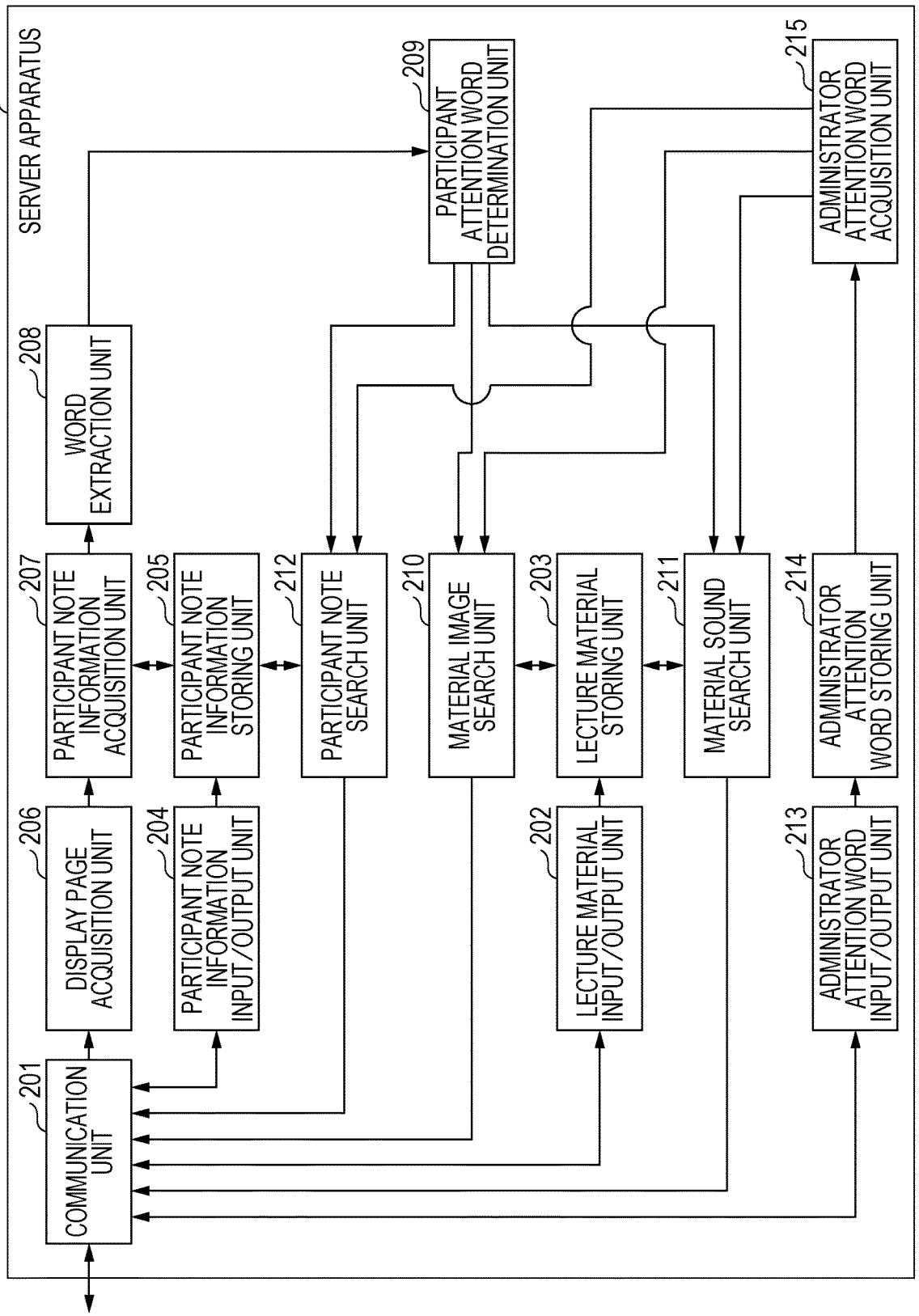
FIG. 17 is a functional block diagram of a server apparatus according to a third exemplary embodiment.

FIG. 17 is a functional block diagram of the server apparatus 20 according to the third exemplary embodiment.

The server apparatus 20 according to the third exemplary embodiment is different from the server apparatus 20 according to the first exemplary embodiment (see FIG. 2) in that the server apparatus 20 according to the third exemplary embodiment further includes an administrator attention word input/output unit 213, an administrator attention word storing unit 214, and an administrator attention word acquisition unit 215.

The administrator attention word input/output unit 213 inputs (writes) an administrator attention word to the administrator attention word storing unit 214 in accordance with an administrator attention word input request (write request) received via the communication unit 201. The administrator attention word input/output unit 213 also outputs (reads) an administrator attention word from the administrator attention word storing unit 214 in accordance with an administrator attention word output request (read request) received via the communication unit 201.

The administrator attention word storing unit 214 stores an administrator attention word for which an input request (write request) is received from the administrator terminal apparatus 30 or the like. The administrator attention word storing unit 214 may store multiple words as administrator attention words.

The administrator attention word acquisition unit 215 acquires an administrator attention word stored in the administrator attention word storing unit 214.

In the third exemplary embodiment, the administrator attention word acquisition unit 215 functions as an example of a reading unit, and an administrator attention word functions as an example of a set word.

[Administrator Attention Word Management Table]

FIG. 18 is a diagram illustrating an example of a configuration of an administrator attention word management table for managing the above-described administrator attention word. The administrator attention word management table is stored in the administrator attention word storing unit 214 provided at the server apparatus 20 (see FIG. 17).

In the administrator attention word management table illustrated in FIG. 18, "administrator attention word information", which provides association between the lecture title of a lecture material and an administrator attention word set for each page of an image file in the lecture title, is registered. The administrator attention word management table according to the third exemplary embodiment is created for each lecture title. FIG. 18 illustrates an administrator attention word management table of a lecture title "Geography (Shikoku)" received by the first participant A to the fifth participant E. In FIG. 18, the first to third pages of multiple pages forming an image file are illustrated, and description of the fourth and later pages is omitted. Furthermore, in FIG. 18, the detailed description of the third page is omitted.

In this example, an administrator attention word in the first page is set to (blank), and an administrator attention word in the second page is set to three words: "Kagawa, population density, area".

[Attention Word Extraction Process]

The procedure for the attention word extraction process according to the third exemplary embodiment is basically the same as that explained above in the first exemplary embodiment. However, the procedure for the attention word extraction process according to the third exemplary embodiment is different from the procedure for the attention word extraction process according to the first embodiment in that the administrator attention word acquisition unit 215 provided at the server apparatus 20 acquires an administrator attention word corresponding to a display page from the administrator attention word storing unit 214 at a time between step S110 and steps S120, S130, and S140.

(Material Image Search Process)

Furthermore, the flow of the material image search process in step S120 is basically the same as that explained above in the first exemplary embodiment. However, the flow of the material image search process according to the third exemplary embodiment is different from the flow of the material image search process according to the first exemplary embodiment in that when a negative determination result (NO) is obtained in step S123 or after processing of step S124 is performed, image text information in the display page acquired in step S107 is searched for the acquired administrator attention word, the administrator attention word in the image information in the display page is set to "different highlight display", which is different from highlight display for the above participant attention word, in the case where the administrator attention word is found, and the process returns to the principal routine illustrated in FIG. 8. In the case where the administrator attention word is not found in the image text information, the process directly returns to the principal routine illustrated in FIG. 8, without performing any processing.

(Material Sound Search Process)

Furthermore, the flow of the material sound search process in step S130 is basically the same as that explained above in the first exemplary embodiment. However, the flow of the material sound search process according to the third exemplary embodiment is different from the flow of the material sound search process according to the first exemplary embodiment in that when a negative determination result (NO) is obtained in step S133 or after processing of step S134 is performed, the audio text information in the display page acquired in step S107 is searched for the acquired administrator attention word, the administrator attention word in the audio information in the display page is set to "different highlight representation", which is different from highlight representation for the above participant attention word, in the case where the administrator attention word is found, and the process returns to the principal routine illustrated in FIG. 8. In the case where the administrator attention word is not found in the audio text information, the process directly returns to the principal routine illustrated in FIG. 8, without performing any processing.

(Participant Note Search Process)

Furthermore, the flow of the participant note search process in step S140 is basically the same as that explained above in the first exemplary embodiment. However, the flow of the participant note search process according to the third exemplary embodiment is different from the flow of the participant note search process according to the first exemplary embodiment in that when a negative determination result (NO) is obtained in step S143 or after processing of step S144 is performed, the participant's own participant note information in the display page acquired in step S141 is searched for the acquired administrator attention word, the administrator attention word in the participant's own participant note information in the display page is set to "different highlight display", which is different from highlight display for the above participant attention word, in the case where the administrator attention word is found, and the process returns to the principal routine illustrated in FIG. 8. In the case where the administrator attention word is not found in the participant's own participant note information in the display page, the process directly returns to the principal routine illustrated in FIG. 8, without performing any processing.

[Specific Example of Attention Word Extraction Process]

Hereinafter, the details of the attention word extraction process according to the third exemplary embodiment will be described by way of two specific examples.

(First Specific Example)

FIGS. 19A to 19D are diagrams for explaining the first specific example of the third exemplary embodiment. FIGS. 19A and 19B are the same as FIGS. 13A and 13B in the first exemplary embodiment. Therefore, the detailed explanation for FIGS. 19A and 19B will be omitted.

FIG. 19D is a diagram illustrating administrator attention word information corresponding to the second page of an image file in the lecture title "Geography (Shikoku)".

In this case, administrator attention words in the display page are three words: "Kagawa, population density, area" (see FIG. 18).

FIG. 19C is a diagram illustrating the state of the image display unit 104 (upper part) and the sound output unit 105 (lower part) at the participant terminal apparatus 10A used by the first participant A after the attention word acquisition process illustrated in FIG. 12 is performed.

FIG. 19C corresponds to FIG. 19A, and illustrates a state in which image display and sound output corresponding to the second page of the image file of the lecture material with the lecture title of "Geography (Shikoku)" illustrated in FIG. 5 are being performed. Therefore, at the participant terminal apparatus 10A, an image indicating comparison results of the prefectures constituting Shikoku is displayed on the slide display unit 93 of the image display unit 104, and sound "Shikoku . . . " is output from the sound output unit 105 in synchronization with the display of the image. Furthermore, on the note display unit 95 of the image display unit 104 illustrated in FIG. 19C, "Kagawa Prefecture is Udon Prefecture.", which is description of the note corresponding to the second page of the image file of the lecture material with the lecture title of "Geography (Shikoku)" illustrated in FIG. 5 of the participant note information of the first participant A illustrated in FIG. 6, is displayed.

In the third exemplary embodiment, a participant attention word in the image information in the display page is set to "highlight display" (step S124). Therefore, the participant attention word in the image in the second page displayed on the slide display unit 93 of the image display unit 104 illustrated in FIG. 19C is displayed in a highlighted manner compared to the original state. In this example, for highlight display of a character, a method for increasing the font size of the character and emphasizing the character (bold character) compared to the original state is adopted.

In the third exemplary embodiment, an administrator attention word in the image information in the display page is set to "different highlight display". Therefore, the administrator attention word in the image in the second page displayed on the slide display unit 93 of the image display unit 104 illustrated in FIG. 19C is displayed in a highlighted manner compared to the original state. In this example, for highlight display of a character, a method for reversing light and darkness compared to the original state is adopted.

Furthermore, in the third exemplary embodiment, the participant attention word in the audio information in the display page is set to "highlight representation" (step S134). Therefore, the participant attention word (a portion surrounded by a frame in the sound output unit 105 illustrated in FIG. 19C) in the sound in the second page output from the sound output unit 105 illustrated in FIG. 19C is represented in a highlighted manner compared to the original state. In this example, for highlight representation of speech, a method for providing a sound effect (for example, a bell sound) at the background of the original speech is adopted.

In the third exemplary embodiment, the administrator attention word in the audio information in the display page is set to "different highlight representation". Therefore, the administrator attention word (a portion in which light and darkness are reversed in the sound output unit 105 illustrated in FIG. 19C) in the sound in the second page output from the sound output unit 105 illustrated in FIG. 19C is represented in a highlighted manner compared to the original state. In this example, for highlight representation of speech, a method for providing a different sound effect (for example, providing a chime sound) at the background of the original speech is adopted.

Furthermore, in the third exemplary embodiment, the participant attention word in the participant's own participant note information in the display page is set to "highlight display" (step S144). Therefore, the participant attention word in description of the note (character string) displayed on the note display unit 95 of the image display unit 104 illustrated in FIG. 19C is displayed in a highlighted manner compared to the original state. In this example, for highlight display of a character, a method for increasing the font size of the character and emphasizing the character (bold character) compared to the original state is adopted.

Furthermore, in the third exemplary embodiment, the administrator attention word in the participant's own participant note information in the display page is set to "different highlight display". Therefore, the administrator attention word in description of the note (character string) displayed on the note display unit 95 of the image display unit 104 illustrated in FIG. 19C is displayed in a highlighted manner compared to the original state. In this example, for highlight display of a character, a method for reversing light and brightness compared to the original state is adopted.

In this example, with the use of the participant terminal apparatus 10A, the first participant A who receives (views) the lecture title "Geography (Shikoku)" is able to visually and audibly understand a participant attention word which is paid attention by all the participants (the first participant A to the fifth participant E) who are registered as participants for the lecture title "Geography (Shikoku)" and an administrator attention word which is paid attention by the administrator.

(Second Specific Example)

FIGS. 20A to 20E are diagrams for explaining the second specific example of the third exemplary embodiment. As in FIGS. 14A to 14E in the first exemplary embodiment described above, FIGS. 20A to 20E illustrate an example in which image display corresponding to the second page of the image file of the lecture material with the lecture title of "Geography (Shikoku)" illustrated in FIG. 5 is being performed.

In this case, on the slide display unit 93 of the image display unit 104 at the participant terminal apparatuses 10A to 10E, an image indicating comparison results of the prefectures constituting Shikoku is displayed. At the participant terminal apparatuses 10A to 10E, a participant attention word in the image in the second page displayed on the slide display unit 93 of the image display unit 104 is displayed in a highlighted manner (highlight display) compared to the original state, and an administrator attention word is displayed in a highlighted manner (different highlight display) compared to the original state. That is, on the image display unit 104 of the participant terminal apparatuses 10A to 10E, an image of the same contents (including highlight display) is displayed. Although the detailed explanation is not provided, in this case, sound (described in the sound output unit 105 illustrated in FIG. 13C) of the same contents (including highlight representation and different highlight representation) is output from the sound output unit 105 of the participant terminal apparatuses 10A to 10E.

Furthermore, in this case, on the note display unit 95 of the image display unit 104 at each of the participant terminal apparatuses 10A to 10E, description of the participant's own note is displayed. When the participant note search process illustrated in FIG. 11 is performed in the attention word extraction process illustrated in FIG. 8, at each of the participant terminal apparatuses 10A to 10E, the participant attention word in the description of the participant's own note is displayed in a highlighted manner compared to the original state, and the administrator attention word is displayed in a highlighted manner (different highlight display) compared to the original state. That is, on the image display unit 104 of the participant terminal apparatuses 10A to 10E, images of different contents are displayed depending on the participant.

In the third exemplary embodiment, the same word such as "Kagawa" may be set to both a participant attention word and an administrator attention word. As in this example, by using different methods for highlight display or highlight representation between the participant attention word and the administrator attention word, the first participant A who uses the participant terminal apparatus 10A is able to understand the participant attention word and the administrator attention word with a discrimination between them.

In this example, with the use of the participant terminal apparatuses 10A to 10E, each of the first participant A to the fifth participant E who receives (views) the lecture title "Geography (Shikoku)" is able to visually and audibly understand a participant attention word which is paid attention by all the participants (the first participant A to the fifth participant E) who are registered as participants for the lecture title "Geography (Shikoku)" and an administrator attention word which is paid attention by the administrator.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a processor programmed to:
acquire character information inputted by a plurality of users of a plurality of terminal devices, the character information being input onto content, so as to provide annotations relative to the content, a display of each of the plurality of terminal devices simultaneously displaying both the content and the inputted character information, wherein the inputted character information is only displayed on a respective one of the plurality of terminal devices where the character information is input;
change a representation form of a word in the content, such that the representation form of the word is more recognizable than remaining words of the content, the word in the content being a word corresponding to a word that most frequently appears in the character information inputted to all of the plurality of terminal devices; and control the display of each terminal device of the plurality of terminal devices to display the word in the changed representation form.

\* \* \* \* \*